(12) United States Patent  
Perry

(10) Patent No.: US 8,662,156 B2
(45) Date of Patent: *Mar. 4, 2014

(54) HEAT TRANSFER BETWEEN TRACER AND PIPE

(75) Inventor: Thomas William Perry, Charlotte, NC (US)

(73) Assignee: QMax Industries, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,142

(22) Filed: Jun. 6, 2011

(65) Prior Publication Data

US 2011/0297360 A1 Dec. 8, 2011

Related U.S. Application Data

(63) Continuation of application No. PCT/US2009/066904, filed on Dec. 6, 2009.

(60) Provisional application No. 61/120,425, filed on Dec. 6, 2008, provisional application No. 61/167,023, filed on Apr. 6, 2009.

(51) Int. Cl.
 *F28F 7/00* (2006.01)

(52) U.S. Cl.
 USPC .......................................................... 165/185

(58) Field of Classification Search
 USPC ............. 165/164, 185, 104.15; 118/204, 216, 118/255
 See application file for complete search history.

(56) References Cited

U.S. PATENT DOCUMENTS 2,982,992 A * 5/1961 Brown et al. ................... 425/87
3,331,946 A 7/1967 Bilbro
(Continued)

FOREIGN PATENT DOCUMENTS

GB 2034203 A * 6/1980 .............. B05C 11/02
JP 2000-110985 A 4/2000
(Continued)

OTHER PUBLICATIONS

"International Search Report" and "Written Opinion of the International Search Authority" (Korean Intellectual Property Office) in Perry et al. International Patent Application Serial No. PCT/US2009/066904 dated Jul. 1, 2010, 14 pages.

(Continued)

*Primary Examiner* — Marc Norman
*Assistant Examiner* — Devon Russell
(74) *Attorney, Agent, or Firm* — Tillman Wright, PLLC; Chad D. Tillman; Jeremy C. Doerre

(57) ABSTRACT

A heat transfer element includes curved mounting surfaces configured to mate with an outer surface of a pipe for attachment thereto; and a channel configured to receive a tracer therein. The heat transfer element is configured to effect conductive heat transfer from the tracer to the pipe, or to process flowing through the pipe, when attached with heat transfer cement (HTC) to both the pipe and the tracer. A system includes a pipe and a tracer; HTC; and a heat transfer element having curved mounting surfaces configured to mate with an outer surface of the pipe and attached thereto via the HTC, and a channel in which the tracer is received and secured via HTC. The heat transfer element is configured to effect conductive heat transfer from the tracer to the pipe, or to process flowing through the pipe, when attached with HTC to both the pipe and the tracer.

20 Claims, 28 Drawing Sheets

(56) References Cited

U.S. PATENT DOCUMENTS

| | | | | |
|---|---|---|---|---|
| 3,782,452 | A | * | 1/1974 | Ceplon .................. 165/135 |
| 4,123,837 | A | * | 11/1978 | Horner .................. 29/890.045 |
| 4,203,186 | A | * | 5/1980 | Horner .................. 29/890.045 |
| 4,334,142 | A | | 6/1982 | Blackmore |
| 4,401,156 | A | * | 8/1983 | Wojtecki et al. .............. 165/172 |
| 4,429,845 | A | * | 2/1984 | Stover et al. .................. 246/428 |
| 5,086,836 | A | * | 2/1992 | Barth et al. .................. 165/164 |
| 6,595,241 | B2 | | 7/2003 | Chen |
| 2010/0078155 | A1 | * | 4/2010 | Morra .................. 165/104.32 |

FOREIGN PATENT DOCUMENTS

| | | | | |
|---|---|---|---|---|
| JP | 2000110985 | A | * 4/2000 | ............. F16L 53/00 |
| JP | 2003-307396 | A | 10/2003 | |
| JP | 2006-317046 | A | 11/2006 | |
| KR | 10-2002-0089736 | A | 11/2002 | |
| KR | 10-0563847 | B1 | 3/2006 | |
| WO | 03-074926 | A1 | 9/2003 | |
| WO | 2010065946 | A2 | 6/2010 | |
| WO | 2010065946 | A3 | 8/2010 | |
| WO | 2011103410 | A2 | 8/2011 | |
| WO | 2011103410 | A3 | 12/2011 | |

OTHER PUBLICATIONS

"International Search Report" and "Written Opinion of the International Search Authority" (Korean Intellectual Property Office) in 3IP, LLC et al. International Patent Application Serial No. PCT/US2011/025415 dated Oct. 11, 2011, 8 pages.

* cited by examiner

HEAT TRANSFER BETWEEN TRACER AND PIPE

CROSS REFERENCE TO RELATED APPLICATIONS

The present application is a U.S. continuation patent application of, and claims priority under 35 U.S.C. §120 to, international patent application no. PCT/US2009/066904, filed Dec. 6, 2009, which published as WO 2010/065946, which patent application and patent application publication are hereby incorporated herein by reference, and which patent application is, for purposes of the U.S., a U.S. nonprovisional patent application of, and claims priority under 35 U.S.C. §119(e) to, U.S. provisional patent application Ser. No. 61/120,425, filed Dec. 6, 2008, and U.S. provisional patent application Ser. No. 61/167,023, filed Apr. 6, 2009. Each of these provisional patent applications is also hereby incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to heat transfer from a tracing system to a pipe system, and more specifically to methods, systems, and apparatus for conductive heat transfer between a tracer and a pipe.

Insulation

It will be appreciated that pipes, and pipe systems, are widely used for innumerable disparate functions, such as, for example, transporting water or other fluids. It is often desirable to maintain a fluid transported via a pipe system, such as water, above an ambient temperature of an environment in which the pipe is located. In this event, insulation is commonly used to try to minimize heat loss.

As an example, consider turbulent hot water flowing at two hundred degrees Fahrenheit (200° F.) through a four inch (4") schedule 40 carbon steel pipe disposed in an environment where the temperature of the surrounding atmosphere is twenty degrees Fahrenheit (20° F.) with high winds (It should be noted, and will be appreciated, that this example, as well as several other numerical examples utilized herein, represent approximations of beliefs that it is believed are helpful in conveying a generalized understanding to a skilled artisan). To attempt to minimize heat loss, the pipe is insulated with two inches (2") of fiberglass insulation. It will be appreciated, however, that despite the insulation, heat is still lost from the process, i.e. from the hot water flowing through the pipe.

Specifically, heat loss per foot of pipe, $Q_{out}$, is equal to the overall heat transfer coefficient from the process to the atmosphere, u, times the total heat loss surface area, A, times the difference between the temperature of the water and the temperature of the atmosphere, $\Delta T$. This is represented by the equation: $Q_{out}=u*A*\Delta T$ The difference between the temperature of the water and the temperature of the atmosphere, $\Delta T$, is one hundred and eighty degrees Fahrenheit (180° F.), i.e. 200° F. minus 20° F.

The area, A, is determinable by first taking the outside diameter of the pipe, i.e. four point five inches (4.5"), adding the thickness of the insulation, i.e. four inches (4") (two inches on each side), multiplying that calculated diameter by pi ($\pi$), and then multiplying that calculated value by the length being considered, in this case, 1 foot (1 ft). Thus, the area, A, is approximately 2.224 ft$^2$.

The overall heat transfer coefficient, u, is determinable as well. In this case, the inverse of u equals the sum of: the inverse of the convection coefficient of the water, $h_1$, which convection coefficient is approximately 100 BTU/hour ft$^{2\circ}$ F.; the wall thickness of the pipe, $L_1$, which is approximately 0.237 inches, or 0.01975 ft, divided by the conduction coefficient of the pipe, $k_1$, which is approximately 30 BTU/hour ft ° F.; the thickness of the insulation, $L_2$, which is approximately 2 inches, or 0.1667 ft, divided by the conduction coefficient of the insulation, $k_2$, which is approximately 0.04 BTU/hour ft ° F.; and the inverse of the convection coefficient of air, $h_2$, which convection coefficient is approximately 8 BTU/hour ft$^{2\circ}$ F. In other words, $1/u=1/h_1+k_1/L_1+k_2/L_2+1/h_2$. Thus, the overall heat transfer coefficient, u, is approximately 0.2324 BTU/hour ft$^{2\circ}$ F.

The heat loss per foot of pipe, $Q_{out}$, is approximately equal to the product of each of these approximations, i.e. $Q_{out}$ is approximately 93.03 BTU/hour per foot of pipe. It will be appreciated that this approximate value is calculated for the first foot of pipe at an instant. Because the temperature difference, $\Delta T$, is constantly changing, determination of heat loss for each foot thereafter becomes iterative. However, consideration of this approximation at a first foot of pipe at an instant nonetheless illustrates that insulation is commonly insufficient to prevent significant heat loss from a liquid or gas flowing through a pipe.

Tube Tracing Systems

Owing to this insufficiency, tube tracing systems are commonly used with pipe systems to heat, or replace heat lost from, liquids and gases flowing through a pipe. Tube tracing systems are conventionally used separate from, or in combination with, insulation. FIG. 1, labeled as prior art, is a cross-sectional view of a conventional tracing system and pipe system in which a tracer 8 is attached to a pipe 6. The tracer 8 may comprise either a fluid tracer, i.e. a tube having a heating medium, such as steam, hot water, hot oil, or another fluid, flowing therethrough, or an electrical tracer. Both the tracer 8 and the pipe 6 are disposed within insulation 4. This type of system can be characterized as utilizing "convection heating", because as a practical matter there is essentially no conductive heat transfer path between the tracer 8 and the pipe 6. Instead, there is simply a void 5 through which convective heat transfer occurs.

It will be appreciated that heat transfer from the tracer 8 to the pipe 6 through the void 5 is limited by the convection coefficient of the void 5. Commonly, the void 5 is filled with unmoving air, in which case even when the convection coefficient of steam flowing through the tracer 8 is very high, which serves to make the convection coefficient of the void 5 higher over time, the heat transfer rate will still always be limited by the low convection coefficient of nonmoving air, i.e. approximately 1 to 3 BTU/hour ft$^{2\circ}$ F. On the other hand, any attempt to increase the convection coefficient of the void 5 by using moving air causes a decrease in the temperature of the air.

It is useful to return to the prior example and consider the heat gain achieved utilizing the tracer 8 and void 5 of FIG. 1. Consider the same 4 inch schedule 40 carbon steel pipe with the same turbulent hot water flowing at two hundred degrees Fahrenheit (200° F.). The heat gain per foot, $Q_{in}$, from a tracer 8 using 50 PSIG steam as a heating source at two hundred ninety eight degrees Fahrenheit (298° F.) can be calculated as the product of: the surface area of heating, A, i.e. the total surface area exposed to the void 5, which is approximately four inches (4"), or 0.33 ft., times one foot; the difference in temperature, ΔT, between the hot water flowing through the pipe and the steam in the tracer, which is approximately one hundred degrees Fahrenheit (100° F.); and the convection coefficient of the air in the void, $h_4$, i.e. 1 BTU/hour ft²° F. Thus, the heat gain, $Q_{in}$, is approximately 33 BTU/hour per foot, although it will be appreciated that this calculation does not account for heat that the process may pull from the system. Nonetheless, it is clear even from such a rough approximation that heat gain from a tracer is at times insufficient to offset heat loss from a fluid flowing through a pipe.

Other tracing systems are disclosed, for example, in U.S. Pat. No. 6,595,241 to Chen, U.S. Pat. No. 4,401,156 to Wojtecki et al., U.S. Pat. No. 4,123,837 to Horner, and U.S. Pat. No. 3,331,946 to Bilbro.

In view of the foregoing, it is believe that a need exists for improvement in heat transfer between a tracer and a pipe. This, and other needs, are addressed by one or more aspects of the present invention.

SUMMARY OF THE INVENTION

The present invention includes many aspects and features. Moreover, while many aspects and features relate to, and are described in, the context of tube tracing systems, the present invention is not limited to use only in tube tracing systems, as will become apparent from the following summaries and detailed descriptions of aspects, features, and one or more embodiments of the present invention. Indeed, while the invention is described herein with reference to heat transfer between a tracing system and a pipe system, it will be appreciated that the breadth of the invention further includes heat transfer between a tracing system or similar arrangement and, for example, a tank, vessel, container, or reservoir.

Accordingly, one aspect of the present invention relates to a heat transfer element for use in tracing systems for heat transfer with a pipe system. The heat transfer element includes curved mounting surfaces configured to mate with an outer surface of a pipe for attachment thereto; and a channel configured to receive a tracer therein; wherein the heat transfer element is configured to effect conductive heat transfer from the tracer to the pipe when attached with heat transfer cement to both the pipe and the tracer. Preferably, the channel includes a lengthwise opening that is located along the a concave face of the heat transfer element between the curved mounting surfaces of the heat transfer element.

In a feature of this aspect of the invention, the heat transfer element further includes cavities defined therein.

In a feature of this aspect of the invention, the cavities are triangular in cross-section.

In a feature of this aspect of the invention, the heat transfer element comprises aluminum.

In a feature of this aspect of the invention, the heat transfer element comprises carbon steel.

In a feature of this aspect of the invention, the heat transfer element comprises stainless steel.

In a feature of this aspect of the invention, the heat transfer element comprises copper.

In a feature of this aspect of the invention, the heat transfer element comprises an aluminum alloy.

In a feature of this aspect of the invention, the heat transfer element comprises an aluminum alloy of grade 6061.

In a feature of this aspect of the invention, the heat transfer element comprises an aluminum alloy of grade 6063.

In a feature of this aspect of the invention, the heat transfer element comprises an aluminum alloy of grade 6005.

In a feature of this aspect of the invention, the heat transfer element comprises aluminum-silicon alloy A356.

In a feature of this aspect of the invention, the heat transfer element is cast.

In a feature of this aspect of the invention, the heat transfer element is extruded.

Another aspect of the present invention relates to a heat transfer system. The heat transfer system includes a pipe having a fluid flowing therethrough; a tracer configured to heat the pipe; heat transfer cement; and a heat transfer element having curved mounting surfaces configured to mate with an outer surface of the pipe and attached thereto via the heat transfer cement, and a channel in which the tracer is received and secured via heat transfer cement; wherein the heat transfer element is configured to effect conductive heat transfer from the tracer to the pipe when attached with heat transfer cement to both the pipe and the tracer.

In a feature of this aspect of the invention, the heat transfer system further includes cavities defined therein.

In a feature of this aspect of the invention, the cavities are triangular in cross-section.

Another aspect of the invention relates to a method for heat transfer. The method includes installing a heat transfer element along an extent of a pipe so as to secure a tracer to the pipe along the extent by securing the heat transfer element to both the pipe and the tracer utilizing heat transfer cement. The heat transfer element is configured to effect conductive heat transfer from the tracer to the pipe through the heat transfer element following such securement.

Another aspect of the invention relates to a method for heat transfer. The method includes bending a tracer tube to a pipe; dry fitting a heat transfer element over the tracer tube on the pipe; removing the heat transfer element; applying heat transfer cement to the heat transfer element using an applicator; installing the heat transfer element such that the tracer tube is secured in close proximity to the pipe; and strapping the heat transfer element to the pipe.

In a feature of this aspect of the invention, the method further includes cutting the heat transfer element with a band saw.

Another aspect of the present invention relates to an applicator for use in applying heat transfer cement to a heat transfer element. The applicator includes a plurality of small protuberances dimensioned to leave small gaps between the applicator and a channel of the heat transfer element when the applicator engages the heat transfer element; and a plurality of large protuberances dimensioned to leave large gaps between the applicator and the heat transfer element when the applicator engages the heat transfer element.

In a feature of this aspect of the invention, the channel is configured to receive a tracer therein such that the tracer is retained between the heat transfer element and a pipe when the heat transfer element is attached to the pipe.

In a feature of this aspect of the invention, the channel is accessible via an opening between the curved mounting surfaces.

In a feature of this aspect of the invention, a top surface of the heat transfer element is located in covering relation to the tracer.

In a feature of this aspect of the invention, the tracer is permanently secured via heat transfer cement.

In a feature of this aspect of the invention, the tracer is retained between the heat transfer element and the pipe.

Another aspect of the invention relates to a heat transfer element. The heat transfer element includes curved mounting surfaces configured to mate with an outer surface of a pipe for attachment thereto; and a channel configured to receive a tracer therein; wherein the heat transfer element is configured to effect conductive heat transfer from the tracer to process flowing through the pipe when attached with heat transfer cement to both the pipe and the tracer.

In a feature of this aspect of the invention, the heat transfer element is anodized.

In a feature of one or more aspects of the invention, the heat transfer element is configured to effect conductive heat transfer between the tracer and the pipe through the heat transfer element when the heat transfer element is attached with heat transfer cement to both the pipe and the tracer.

In a feature of one or more aspects of the invention, the heat transfer element is configured to effect conductive heat transfer between the tracer and the pipe through the curved mounting surfaces of the heat transfer element when the heat transfer element is attached with heat transfer cement to both the pipe and the tracer.

In a feature of one or more aspects of the invention, the tracer comprises an electrical tracer.

In a feature of one or more aspects of the invention, the tracer utilizes steam.

In a feature of one or more aspects of the invention, the tracer utilizes a heated fluid.

In a feature of one or more aspects of the invention, the tracer utilizes a heated liquid.

In a feature of one or more aspects of the invention, the tracer utilizes a coolant.

Other aspects relate to such a heat transfer element for use in tracing systems for heat transfer with a tank, vessel, container, or reservoir, and systems and methods including such heat transfer element.

In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals, and wherein, FIG. 1, labeled as prior art, is a cross-sectional view of a conventional tracing system and pipe system in which a tracer is attached to a pipe.

DETAILED DESCRIPTION

Figure 1:
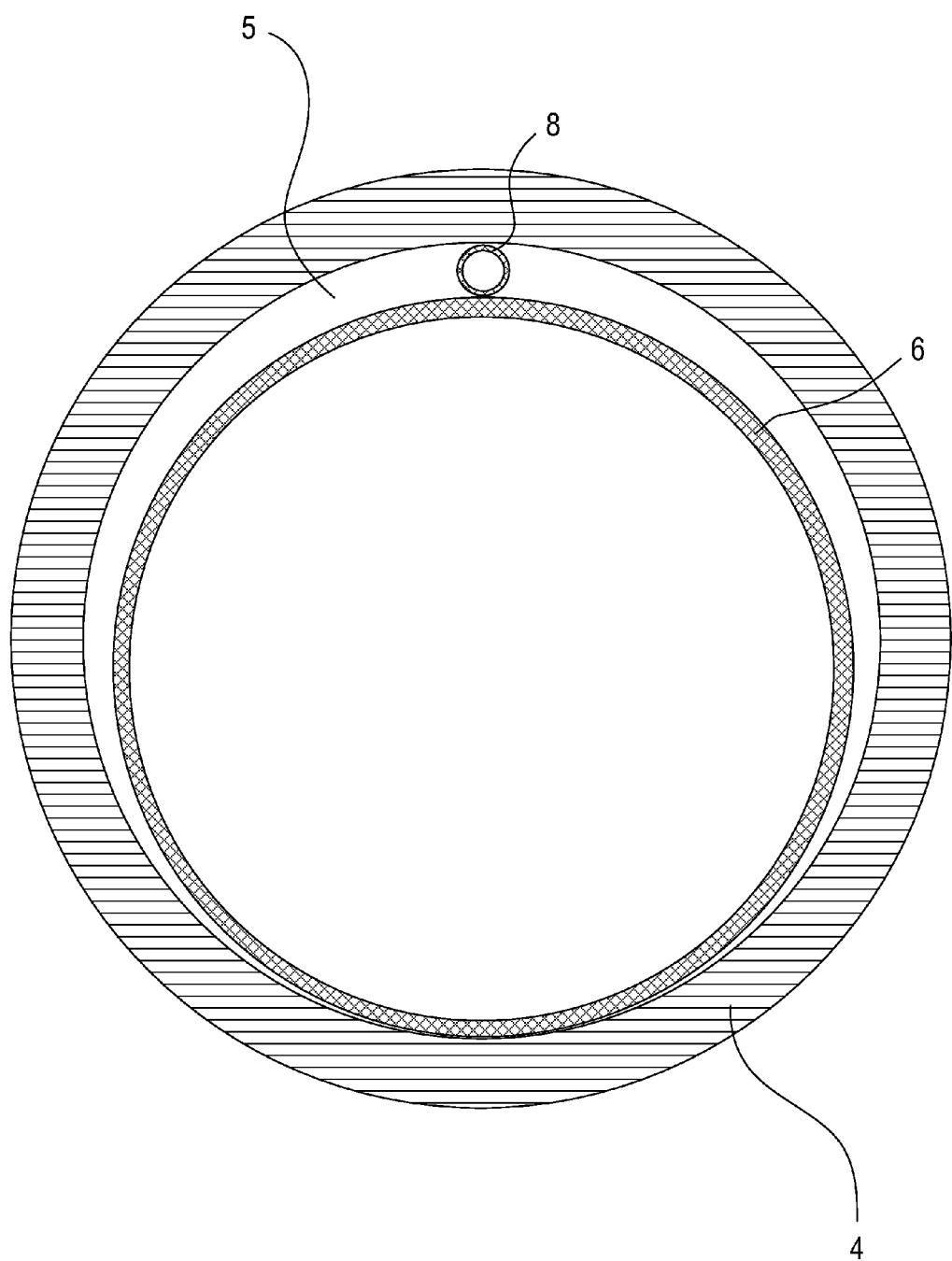

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Figure 2:
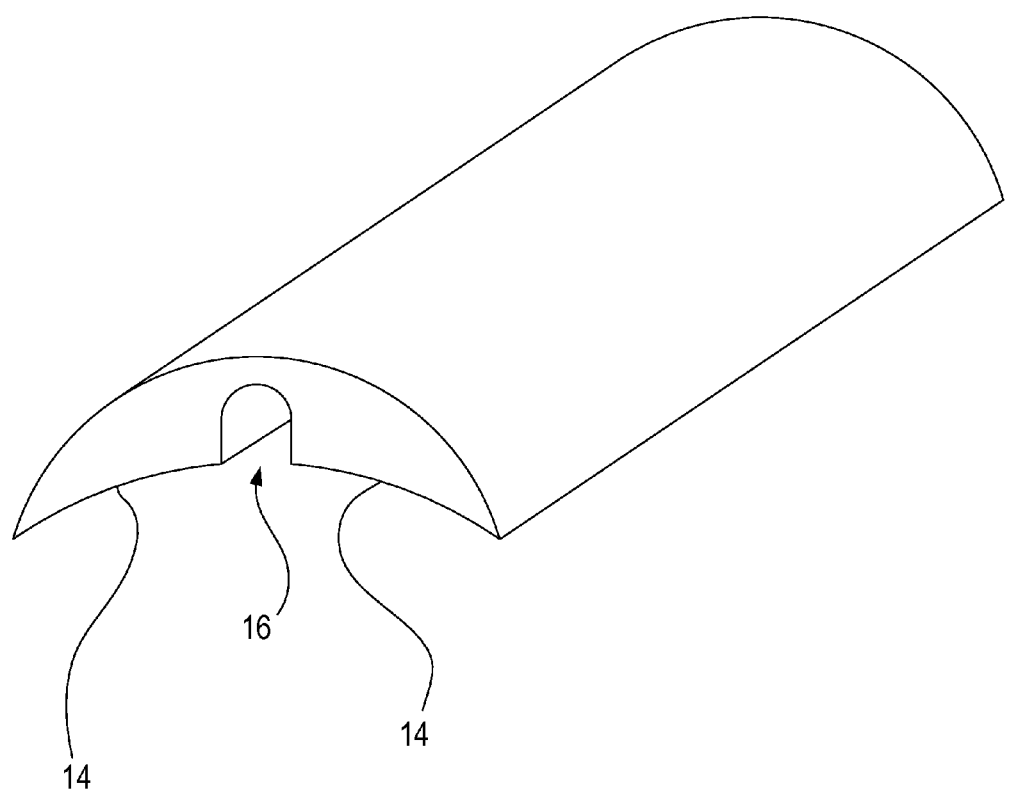
FIG. 2 illustrates an exemplary heat transfer element in accordance with a preferred embodiment of the present invention.

Turning now to the drawings, FIG. 2 illustrates an exemplary heat transfer element 10 in accordance with a preferred embodiment of the present invention. The heat transfer element 10 is configured for use in a conduction-assisted tracing system in accordance with one or more preferred embodiments.

More specifically, the heat transfer element 10 is configured for attachment to a pipe as part of a tracing system. As can be seen in FIG. 2, curved mounting surfaces 14 of the heat transfer element 10 are configured (i.e., shaped and dimensioned) to mate with a curved outer surface of a pipe. Further, a channel 16 is defined lengthwise through the heat transfer element 10 for receipt of a tracer. An opening of the channel 16 is located along a concave face of the heat transfer element 10 between the curved mounting surfaces 14. The tracer is received within the channel 16 through this opening when the tracer is installed, and is thereby retained against the pipe by the heat transfer element 10 when the heat transfer element 10 is attached to the pipe.

Figure 3:
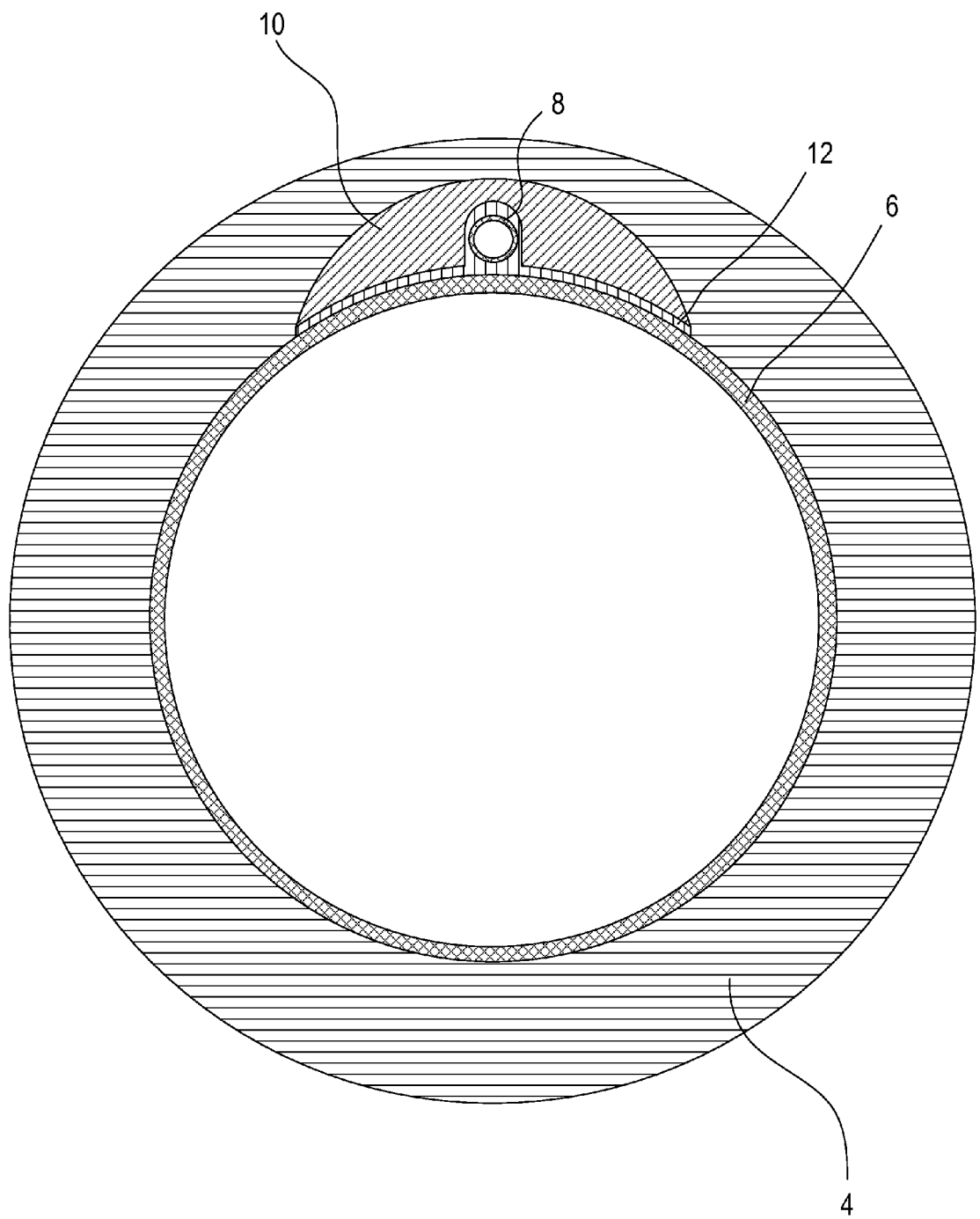
FIG. 3 illustrates, in a cross-sectional view, the heat transfer element of FIG. 2 secured to the pipe of FIG. 1.

FIG. 3 illustrates, in a cross-sectional view, the heat transfer element 10 secured to the pipe 6 of FIG. 1. The heat transfer element 10 is secured to the pipe 6 using heat transfer cement (HTC) 12. Heat transfer cement is well known, and is sometimes referred to as heat transfer mastic (HTM). It will be understood that any heat transfer cement or heat transfer mastic, or any similar substance, may be utilized. It will be appreciated that, in at least this embodiment, rather than simply being used to "create" surface area, the HTC 12 can be characterized as "bridging" any gap between the heat transfer element 10 and the pipe 6. Preferably, a layer of HTC 12 approximately one eighth of an inch (0.125") thick is disposed between the heat transfer element 10 and the pipe 6.

As can be seen in FIG. 3, the heat transfer element 10 is attached to the pipe 6 such that the tracer 8 is received in the channel 16 of the heat transfer element 10. Further, just as HTC 12 is used to bridge the gap between the heat transfer element 10 and the pipe 6, HTC 12 is preferably used to fill the volume of the channel not filled by the tracer 8, i.e. to "bridge" any gaps between the tracer 8 and the heat transfer element 10, as well as any gap between the tracer 8 and the pipe 6. Preferably, a layer of HTC 12 approximately five one hundredths of an inch (0.05") thick is disposed between the heat transfer element 10 and the tracer 8.

As its name implies, the heat transfer element 10 is constructed of a heat conductive material, such as, for example, aluminum, carbon steel, stainless steel, copper, an aluminum alloy, or any other heat conductive material. More preferably, this material comprises an aluminum alloy of grades 6061, 6063, or 6005, and most preferably this material comprises aluminum-silicon alloy A356. The heat transfer element 10 is preferably either cast or extruded, as described in more detail hereinbelow.

Figure 4:
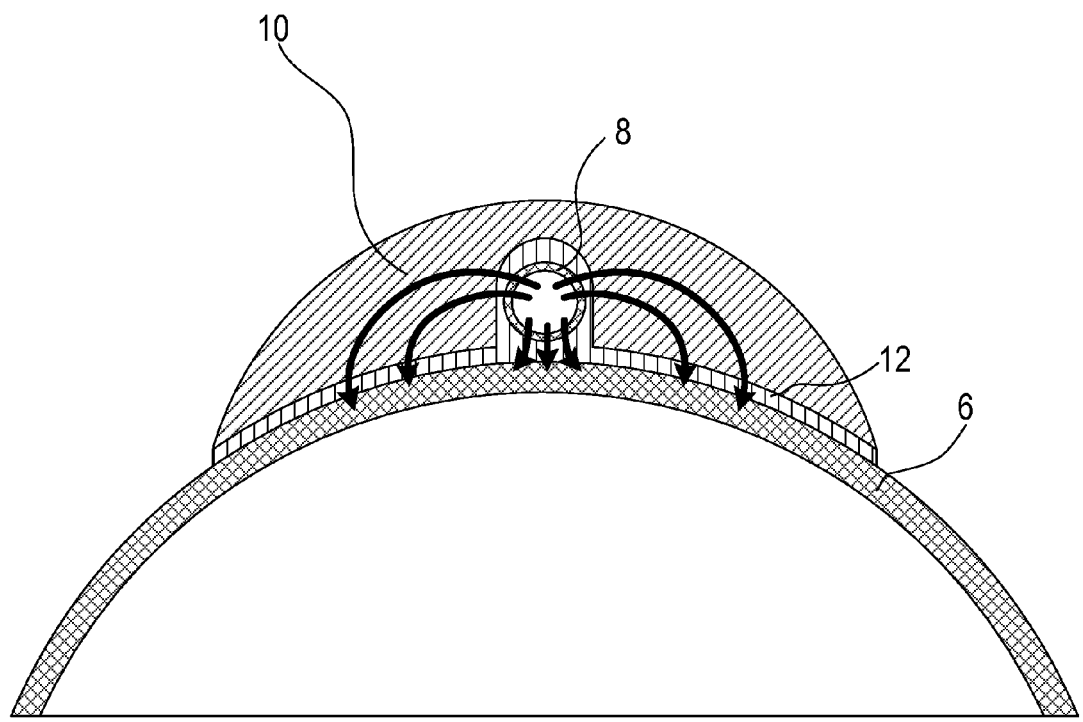
FIG. 4 illustrates conductive heat transfer utilizing the heat transfer element of FIG. 2.

The heat transfer element 10 enhances the transfer of heat from the tracer 8 to the pipe 6 by changing the nature of heat transfer from primarily convective heat transfer to primarily conductive heat transfer. The heat transfer element 10 can thus be characterized as "spreading out" the heat, thus effectively "creating" more surface area for heating. Such conductive heat transfer is illustrated in FIG. 4.

In illustrating benefits of the invention, it is useful to consider heat gain achieved utilizing a tracer 8 and an exemplary heat transfer element 10 with the previous 4 inch schedule 40 carbon steel pipe having the same turbulent hot water flowing at two hundred degrees Fahrenheit (200° F.) therethrough. Heat gain, $Q_{in}$, from the tracer 8 and heat transfer element 10, where the tracer 8 is once again using 50 PSIG steam as a heating source at two hundred ninety eight degrees Fahrenheit (298° F.), can be calculated as the product of: the surface area of heating, A, i.e. the total surface area of the heat transfer element 10 which abuts the pipe 6, which is approximately two inches (2"), or 0.1667 ft., times one foot; the difference in temperature, $\Delta T$, between the hot water flowing through the pipe and the steam in the tracer, which is approximately ninety eight degrees Fahrenheit (98° F.); and the overall heat transfer coefficient from the steam to the process, u. This overall heat transfer coefficient, u, is equal to the sum of: the inverse of the convection coefficient of the water, $h_1$, which convection coefficient is approximately 100 BTU/hour ft$^{2o}$ F.; the wall thickness of the pipe, $L_1$, which is approximately 0.237 inches, or 0.01975 ft, divided by the conduction coefficient of the pipe, $k_1$, which is approximately 30 BTU/hour ft ° F.; the inverse of the overall coefficient of the HTC 12, $u_{HTC}$, which is approximately 35 BTU/hour ft$^{2}$° F.; the estimated average path length between the tubing and the HTC 12, $L_3$, which is approximately one half of an inch (½"), or 0.5 inches, divided by the conduction coefficient of the heat transfer element 10, which is approximately 140 BTU/hour ft ° F.; and the inverse of the convection coefficient of steam, which is approximately 500 BTU/hour ft$^{2}$° F. In other words, $1/u = 1/h_1 + L_1/k_1 + 1/u_{HTC} + L_3/k_3 + 1/h_3$. The overall heat transfer coefficient, u, then, is approximately 23.98 BTU/hour ft$^{2}$° F., and the heat gain, $Q_{in}$, from the tracer 8 and heat transfer element 10 is approximately 391.68 BTU/hour per foot. As compared to the heat gain from a tracer 8 alone as calculated hereinabove, this is an improvement of an order of magnitude, although as noted above, these calculations are approximations of beliefs.

Figure 5:
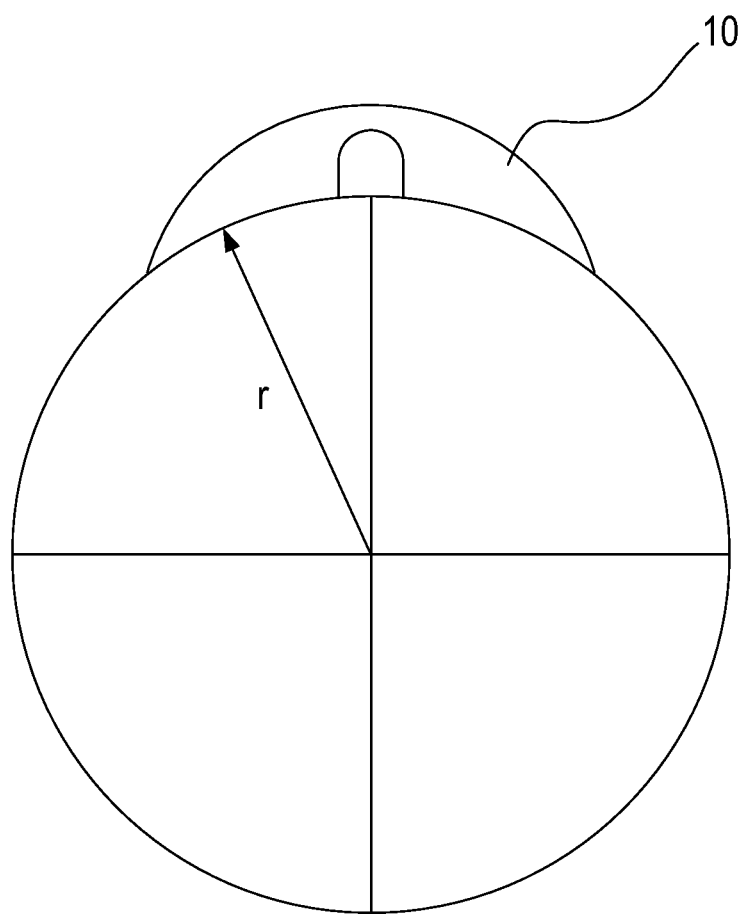
FIG. 5 illustrates how a curved mounting surface can be described as curved to mate with a circle having a certain radius.

Although described hereinabove as having a width of 2 inches (2"), heat transfer element 10 can be manufactured in various sizes and have varying dimensions to mate with different sizes of pipes and tracers. In a preferred implementation, a heat transfer element 10 has a width of two inches (2") (plus or minus 0.1 inches) and a max length of nine feet six inches (9'6"), although it will be appreciated that this heat transfer element can be cut into segments having shorter lengths. Its channel 16 has a width of fifty one one hundredths of an inch (0.51") (plus or minus 0.01 inches), thus it is dimensioned for use with a one half inch (⅝") tracer. The distance between the top of the channel 16 and the top of the heat transfer element 10 is one eighth of an inch (0.125"). Further, its curved mounting surfaces 14 can be described as curved to mate with a circle having a particular radius, as illustrated in FIG. 5. In this preferred implementation the radius is one and three fourths inches (1.75") (plus or minus 0.1 inches), and thus the heat transfer element 10 is sized and dimensioned for use with a three inch (3") pipe.

Figure 6:
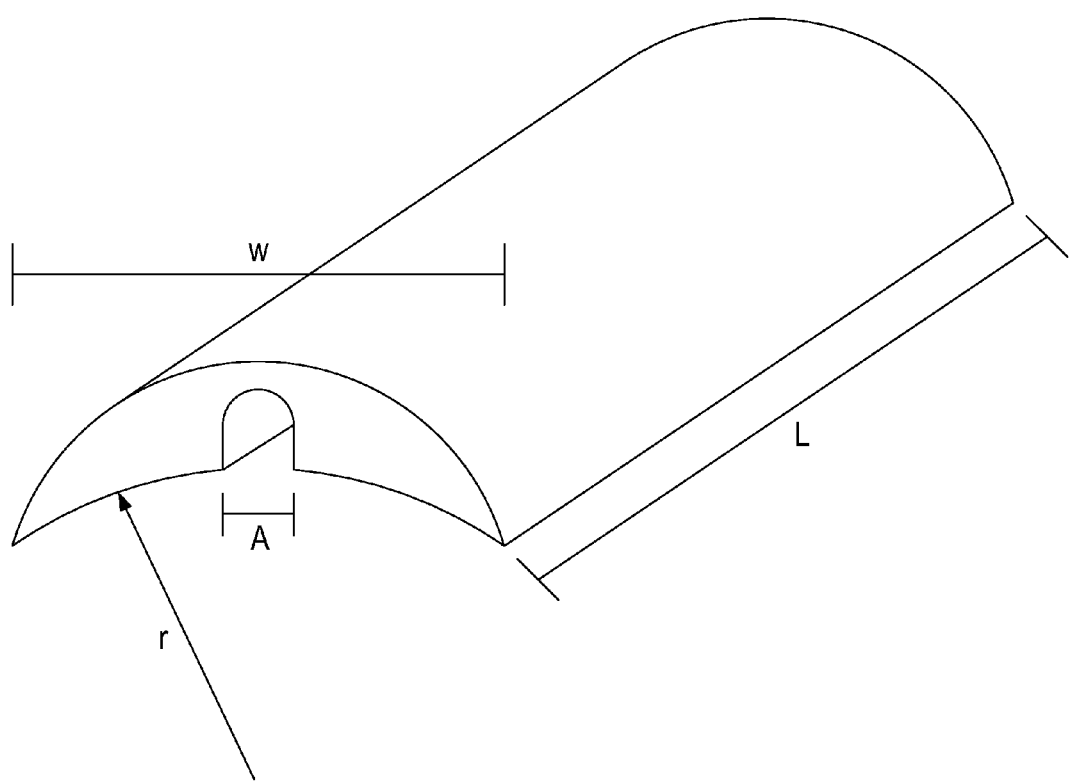
FIG. 6 illustrates how a heat transfer element can be characterized as typically having a length (L), a width (w), a radius of curvature (r), and a channel width (A)

It will be appreciated, then, that a particular heat transfer element 10 can be partially described via several typical dimensions. More specifically, a heat transfer element 10 can be characterized as typically having a length (L), a width (w), a radius of curvature (r), and a channel width (A), as illustrated in FIG. 6.

Figure 7:
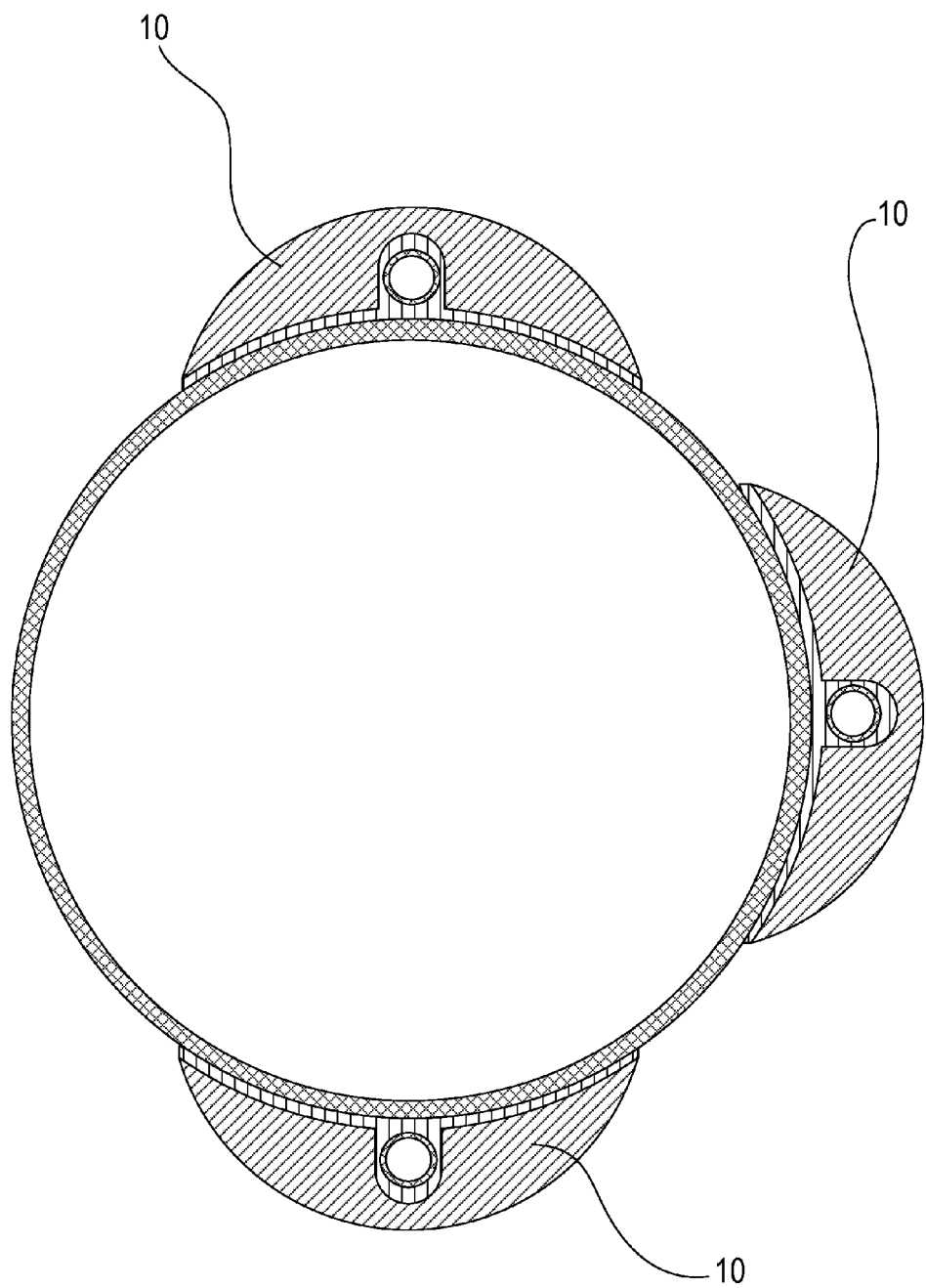
FIG. 7 illustrates the use of multiple heat transfer elements with a single pipe.

In a preferred system, heat transfer elements 10 having r values corresponding to one inch, two inch, three inch, four inch, six inch, eight inch, and ten inch pipe are utilized. In this system, heat transfer elements 10 configured for two inch or smaller pipe have a width, w, of one and a half inches (1.5"), while heat transfer elements 10 configured for larger pipes have a width of two inches (2"). For larger pipes, multiple heat transfer elements 10 may be utilized, as illustrated in FIG. 7. Preferably, each heat transfer element 10 is configured to receive either a one half inch (0.5") tracer or a three fourth inch (0.75") tracer, i.e. each transfer element 10 has an A value corresponding to approximately one half of an inch (0.5") or three fourths of an inch (0.75"). Alternatively, each heat transfer element 10 is configured to receive a three eighths of an inch (0.375") tracer, a five eighths of an inch (0.625") tracer, a seven eighths of an inch (0.875") tracer, or a one inch (1") tracer. Although each heat transfer element 10 illustrated in FIG. 7 is configured to receive the same size tracer, heat transfer elements 10 configured to receive different size tracers may be utilized together with the same pipe, as illustrated in FIGS. 26-33.

Heat Transfer Elements for Non-Linear Pipe Sections

Figure 8:
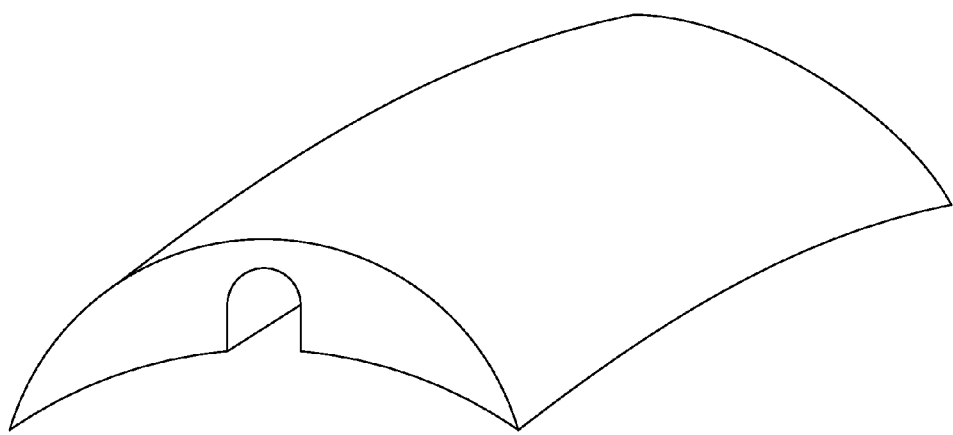
FIG. 8 illustrates an elbow heat transfer element for use with a non-linear section of pipe.

Although thus far described in the context of straight heat transfer elements 10 for use with straight sections of pipe, FIG. 8 illustrates an elbow heat transfer element 30 for use with a non-linear section of pipe. As can be seen in FIG. 8, the elbow heat transfer element 30 has generally the same cross-sectional shape as a heat transfer element 10. An elbow heat transfer element can be classified by the angle of the elbow for which it is configured for attachment. Although elbow heat transfer elements are illustrated herein in the context of ninety degree elbows, it will be understood that elbow heat transfer elements can be configured for attachment to an elbow of any angle. In preferred implementations, elbow heat transfer elements configured for attachment to forty five degree and ninety degree elbows are utilized.

Figure 9:
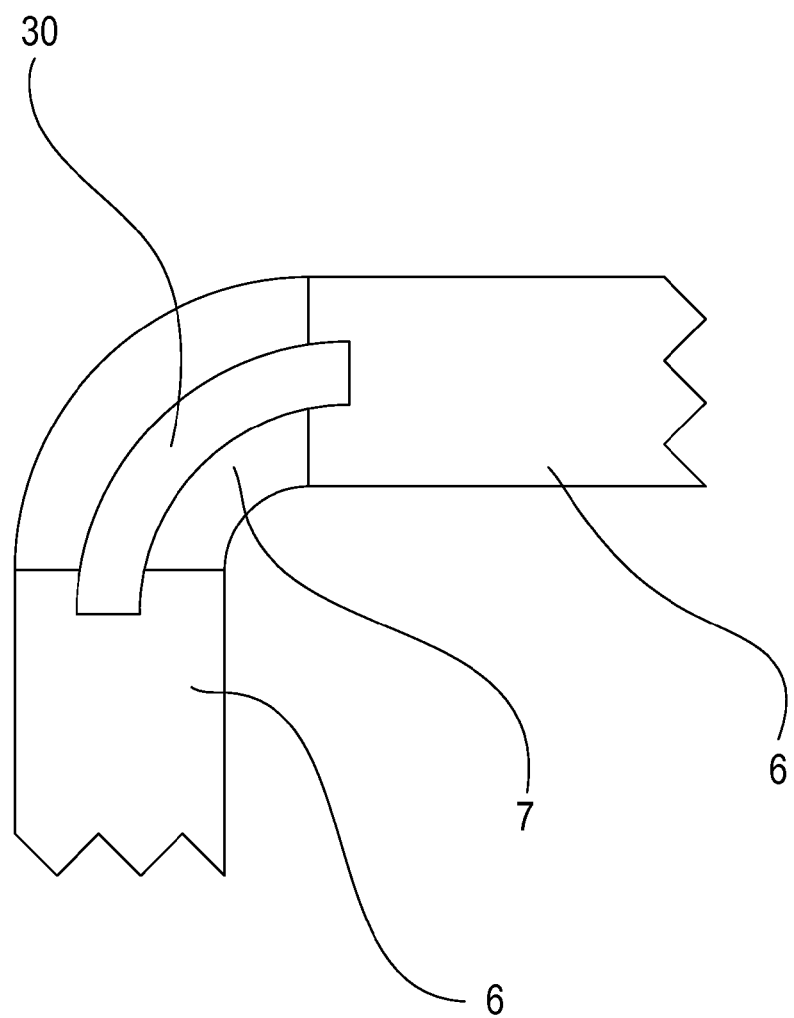
FIG. 9 illustrates how a side elbow heat transfer element is configured for attachment to the top of an elbow pipe.
Figure 10:
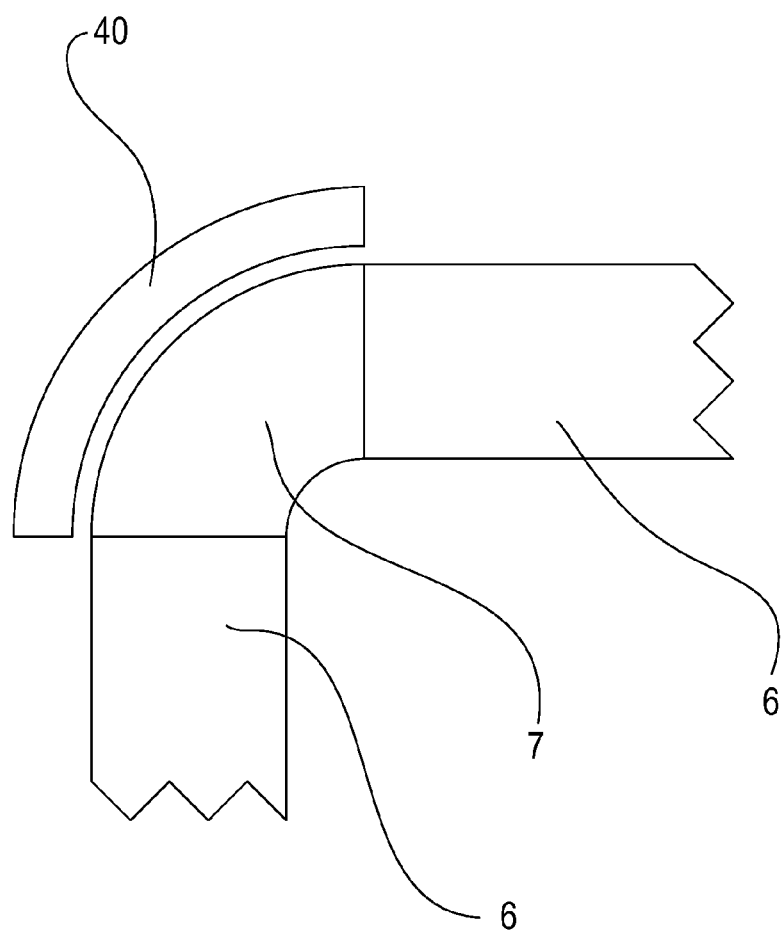
FIG. 10 illustrates how an outside, or heel, heat transfer element is configured for attachment to the heel of a pipe elbow.
Figure 11:
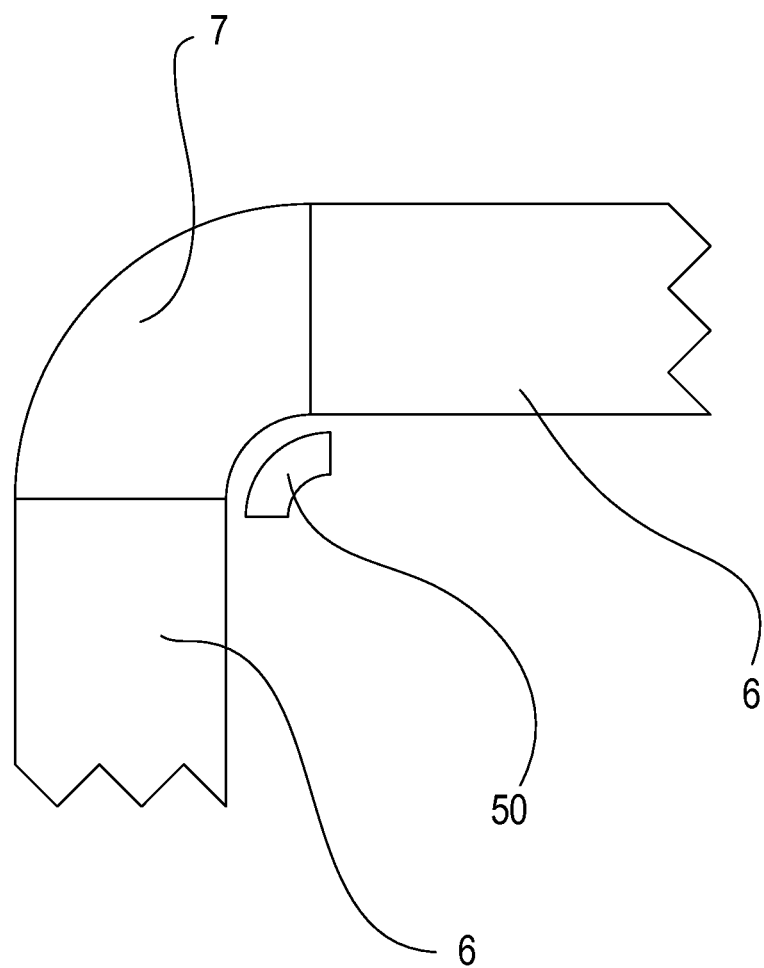
FIG. 11 illustrates how an inside, or throat, heat transfer element is configured for attachment to the throat of a pipe elbow.

An elbow heat transfer element can also be classified by where it is configured to attach to an elbow pipe. Elbow heat transfer element 30 is a side elbow heat transfer element because it is configured for attachment to the top or bottom of an elbow pipe, as illustrated in FIG. 9. In contrast, outside, or heel, heat transfer element 40 is configured for attachment to the heel of a pipe elbow as illustrated in FIG. 10 and inside, or throat, heat transfer element 50 is configured for attachment to the throat of a pipe elbow as illustrated in FIG. 11.

Figure 12A:
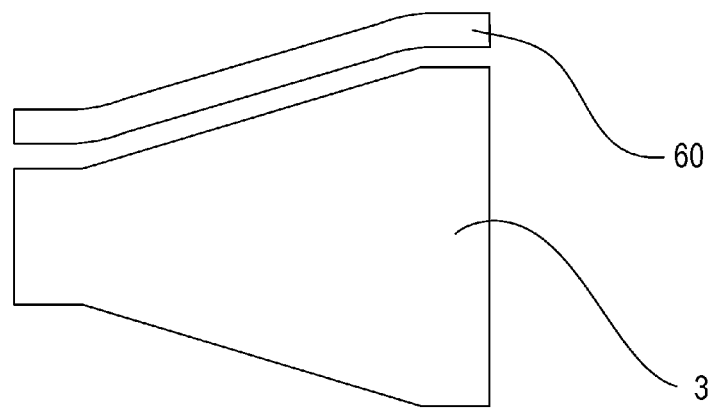
FIGS. 12A-B illustrate a heat transfer element configured to mate with a concentric reducer.
Figure 12B:
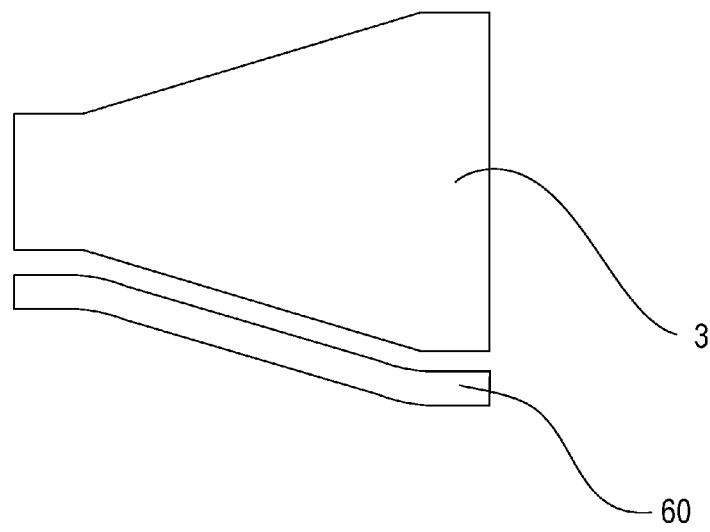
Figure 13A:
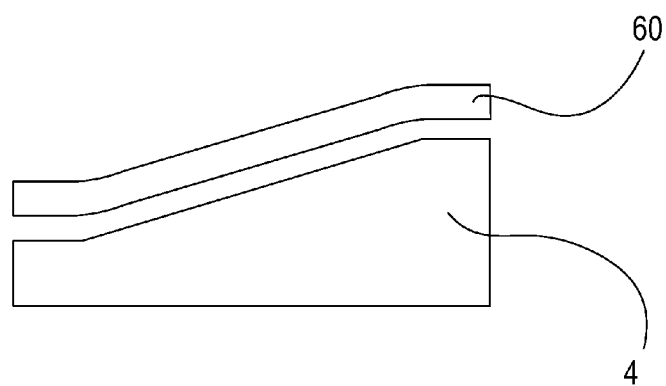
FIGS. 13A-B illustrate how the heat transfer element of FIGS. 12A-B is also suitable for use with an eccentric reducer, and further illustrates how the heat transfer element of FIG. 2 may be suitable as well.
Figure 13B:
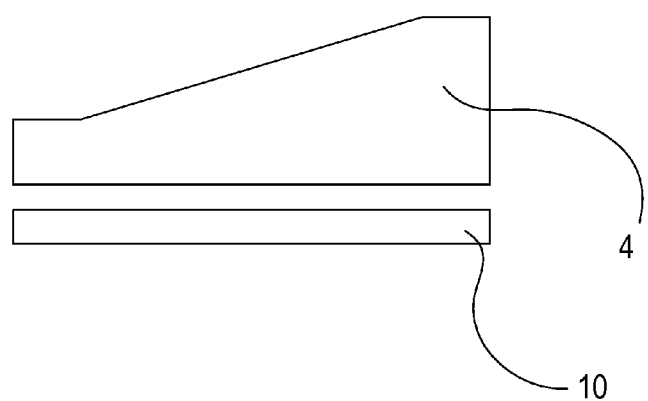

Similarly, FIGS. 12A-B illustrate a heat transfer element 60 configured to mate with a concentric reducer 3. FIGS. 13A-B illustrate how heat transfer element 60 is also suitable for use with an eccentric reducer, and further illustrates how heat transfer element 10 is suitable as well.

Figure 14:
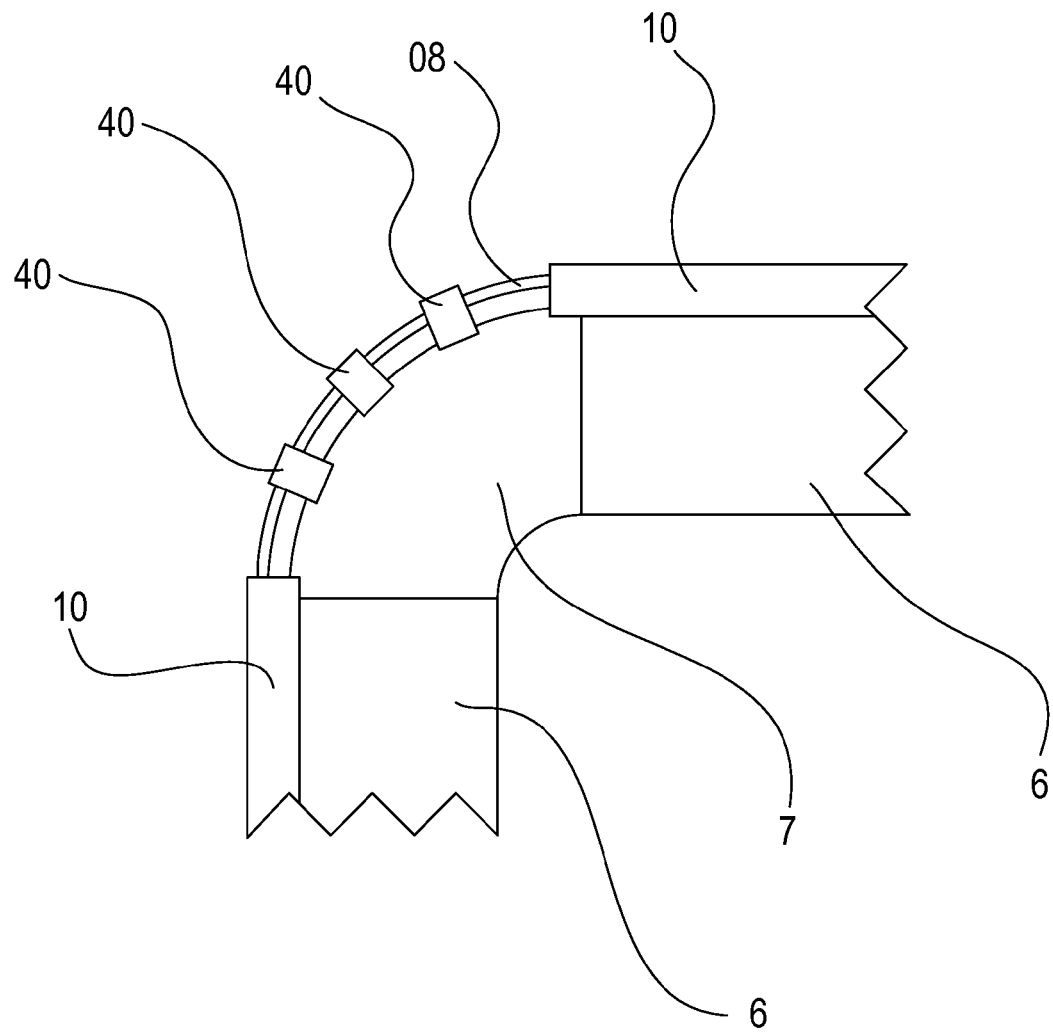
FIG. 14 illustrates a plurality of heel heat transfer elements spaced apart along an elbow.

In at least some implementations, rather than using longer heat transfer elements 10,30,40,50,60, individual heat transfer elements 10,30,40,50,60 having a shorter length can be spaced apart along an expanse of pipe. FIG. 14 illustrates a plurality of heel heat transfer elements 40 spaced apart along an elbow 7.

Notably, although no insulation is illustrated in FIGS. 9-14 for clarity, insulation is preferably (and should be) used to surround each assembly.

Alternative Cross-Sectional Shapes

Thus far, each heat transfer element 10,30,40,50,60 has been described as having generally the same cross-sectional shape, namely that illustrated in FIG. 3. Each heat transfer element, however, can alternatively have a different cross-sectional shape, such as, for example, that illustrated in FIG. 15.

Figure 15:
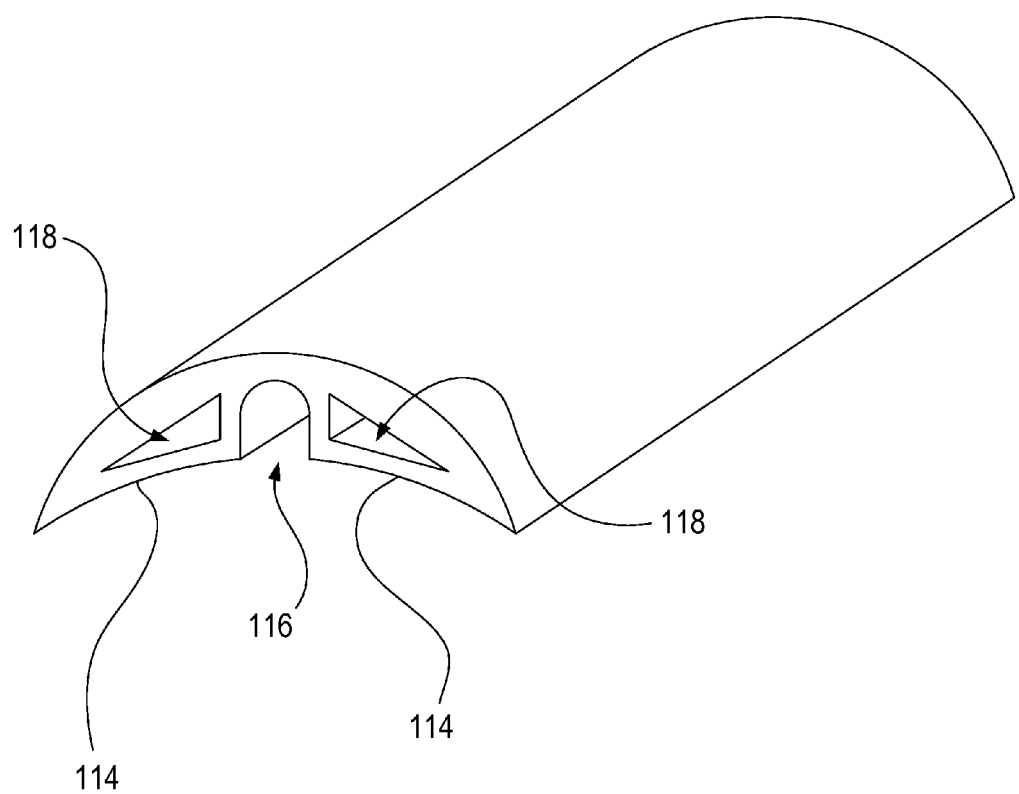
FIG. 15 illustrates a heat transfer element which is similar to the heat transfer element of FIG. 1, except in that this heat transfer element additionally includes cavities defined therethrough in a lengthwise direction.

FIG. 15 illustrates heat transfer element 110 which is similar to heat transfer element 10 of FIG. 1, except in that heat transfer element 110 additionally includes cavities 118 defined therethrough in a lengthwise direction. It will be appreciated that the weight of the heat transfer element 110 is less than it might otherwise be if the heat transfer element 110 did not include cavities 118 due to the additional material costs.

Figure 16:
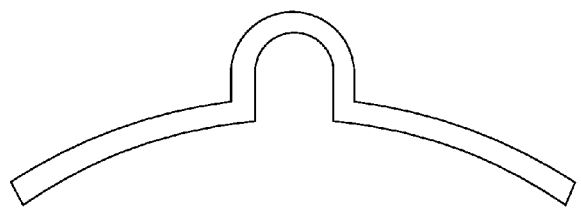
FIGS. 16-19 are cross-sectional views of heat transfer elements having different cross-sectional shapes.
Figure 17:
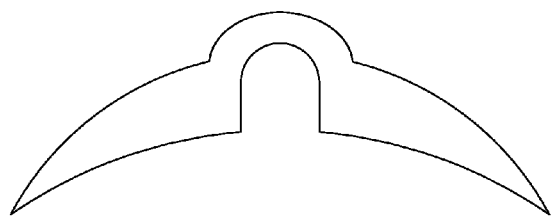

Similarly, FIGS. 16 and 17 are cross-sectional views of heat transfer element 210 and heat transfer element 310, respectively. As can be seen in these figures, each heat transfer element 210,310 has a different cross-sectional shape. Just like heat transfer element 110, the cross-sectional shape of each heat transfer element 210,310 has a smaller area comparatively to the cross-sectional shape of heat transfer element 10, and thus is comparatively lighter than a similarly dimensioned heat transfer element 10.

Figure 18:
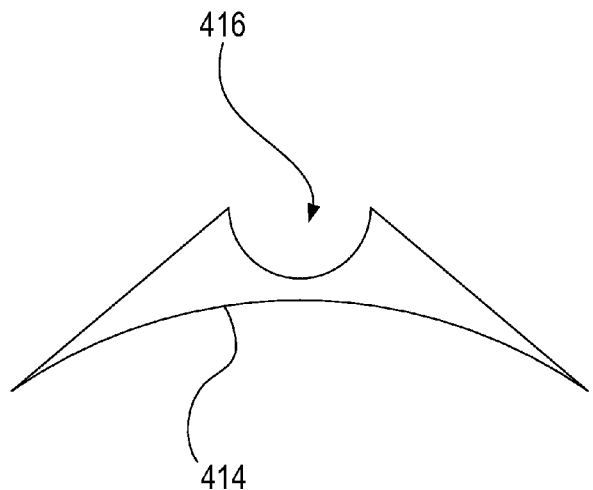
Figure 19:
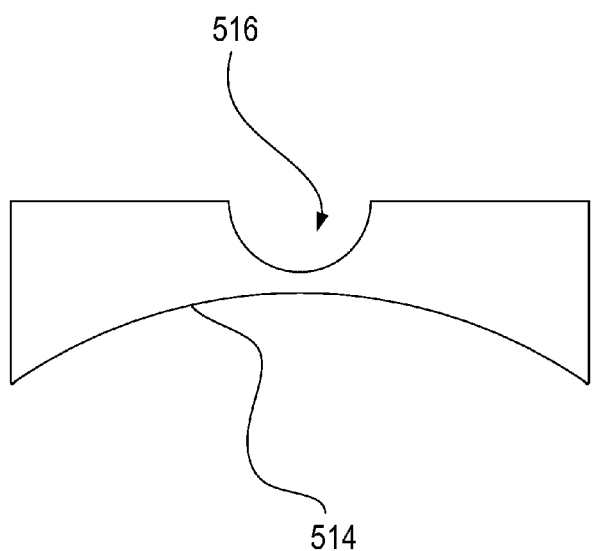

Other contemplated heat transfer elements have cross-sectional shapes that differ even more markedly from that of heat transfer element 10, such as, for example, heat transfer element 410 and heat transfer element 510, illustrated in FIGS. 18 and 19 respectively. Rather than being configured to retain a tracer in a channel 16 against a pipe to which it is attached like heat transfer element 10, each of these heat transfer elements 410,510 is configured to sit between a tracer and a pipe, with the pipe being secured to the mounting surfaces 414,514 and the tracer being secured in its channel 416,516.

Figure 20:
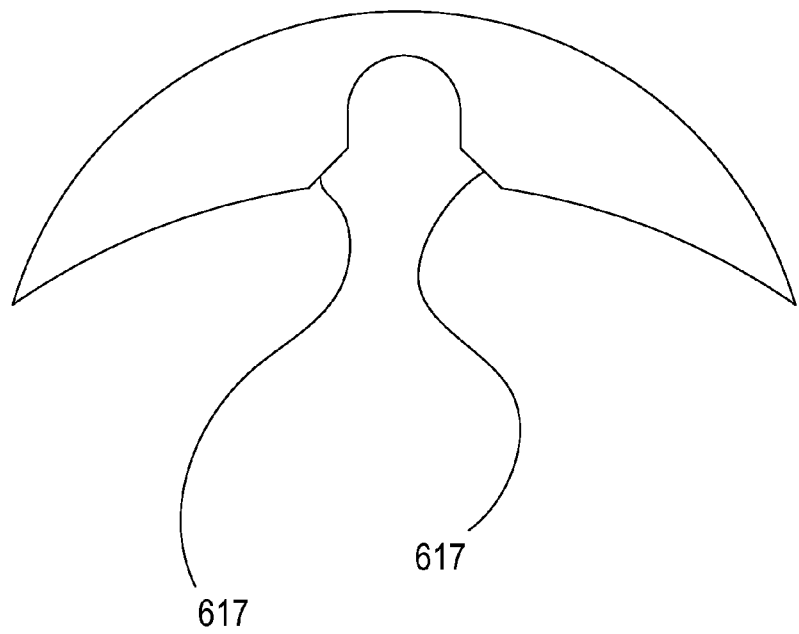
FIG. 20 is a cross-sectional view of a heat transfer element which has chamfered edges.
Figure 21:
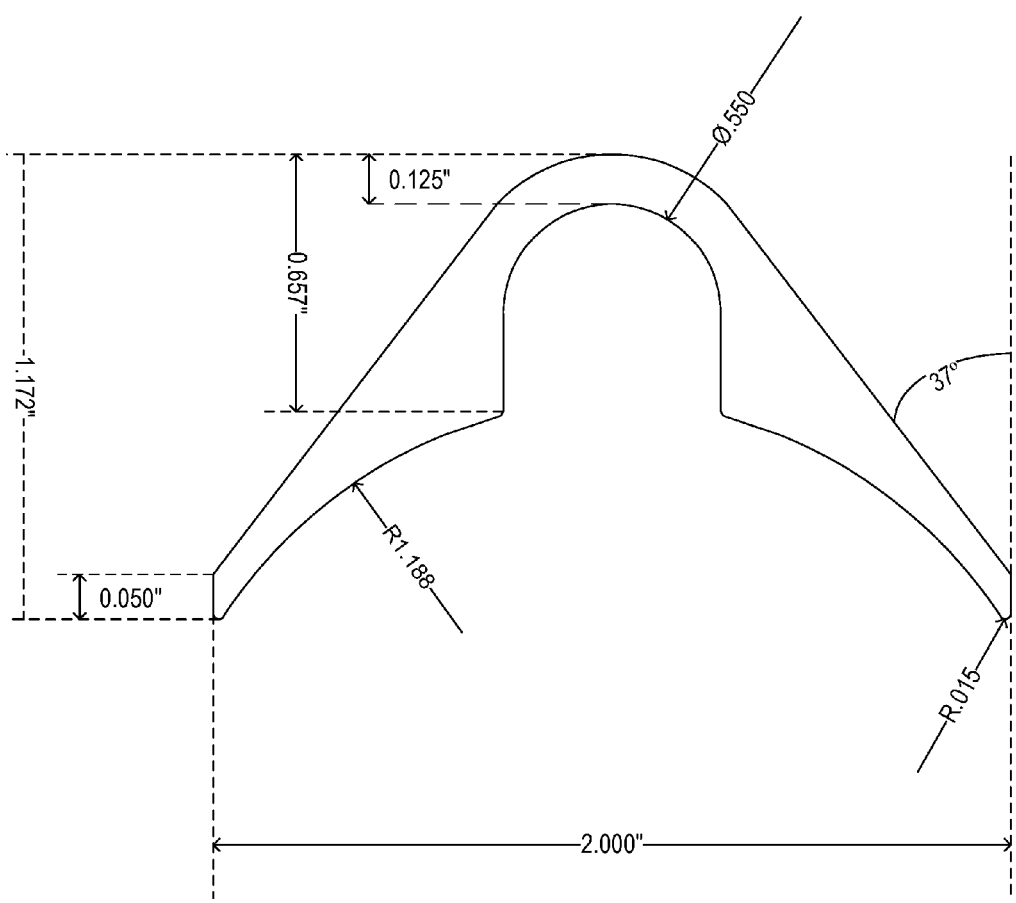
FIG. 21 is a cross-sectional view of a heat transfer element which has corners with a 0.015 inch fillet.

Some heat transfer elements have cross-sectional shapes that utilize chamfered edges. FIG. 20 is a cross-sectional view of heat transfer element 610, which includes chamfered edges 617. Any edge of any heat transfer element may utilize such chamfering. Similarly, some heat transfer elements have cross-sectional shapes that have filleted corners. FIG. 21 is a cross-sectional view of a heat transfer element 710 which has corners with a 0.015 inch fillet. Any corner of any heat transfer element may include such a fillet.

The cross-sectional shape of heat transfer element 710 corresponds to preferred dimensions for a heat transfer element. FIG. 21 includes measurements for these preferred dimensions.

Installation

In use, a heat transfer element can be installed on pipe with a tube tracer via the following process. First, a tube tracer is bent or pre-bent as is commonly known. Next, one or more heat transfer elements are "dry-fitted" over the tube tracer on the pipe. The heat transfer element can be a precut to specific lengths, or, alternatively, can be cut on-site using a band saw.

After being dry fit over a tube tracer, the heat transfer element is removed, preferably with the tube tracer, although it is contemplated that the tube tracer may not be removed, and, in fact, may already be secured to the pipe.

Figure 22A:
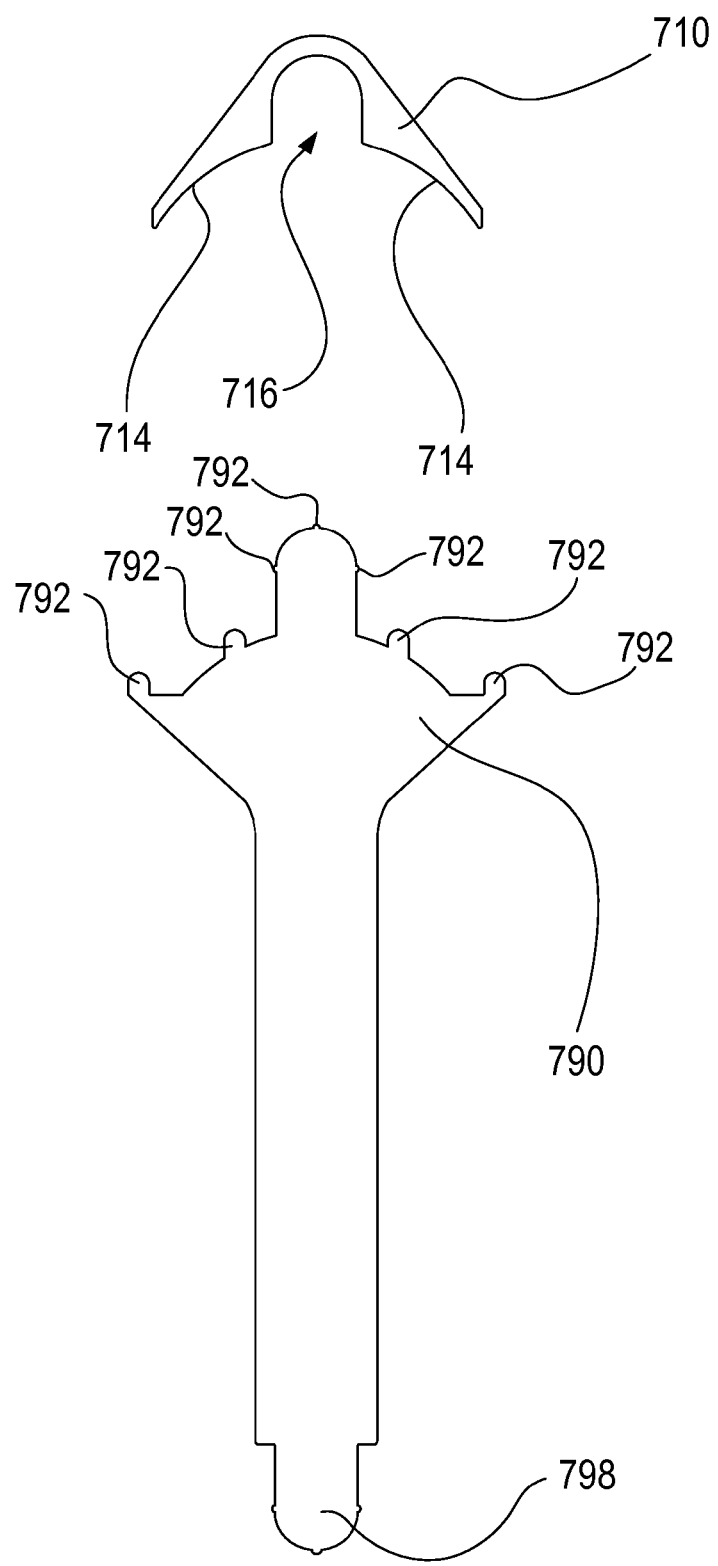
FIG. 22A is a plan view of an applicator configured for use with the heat transfer element of FIG. 21.
Figure 22B:
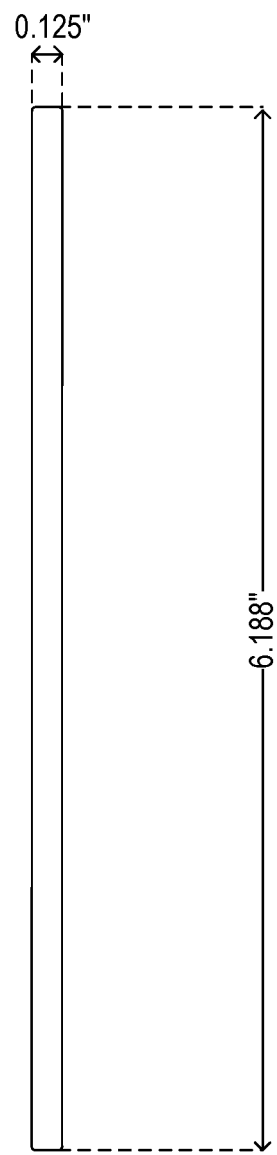
FIG. 22B is a side plan view of the applicator of FIG. 22A.
Figure 23:
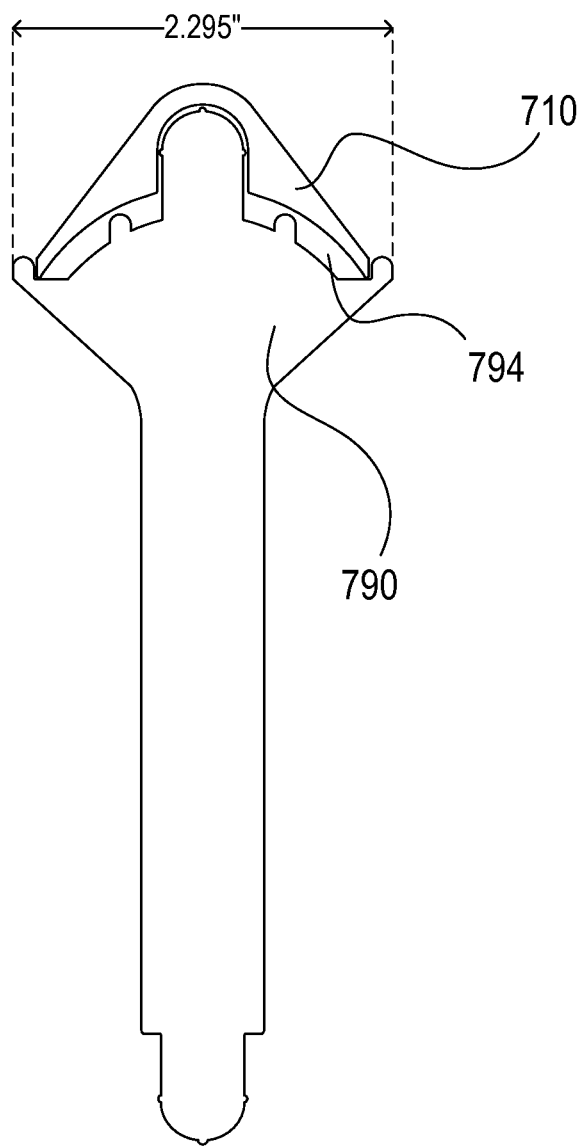
FIG. 23 illustrates how the applicator of FIG. 22A is configured to be used with the heat transfer element of FIG. 21.

HTC is next applied to the heat transfer element. Preferably, this HTC is applied using an applicator (although it could be applied manually using a trowel, or otherwise). FIG. 22A is a plan view of an applicator 790 configured for use with heat transfer element 710. HTC is applied to the applicator 790 and/or the heat transfer element 710, and the applicator 790 is then used to even the amount of HTC disposed on the heat transfer element. FIG. 23 illustrates how the applicator 790 is configured to be used with the heat transfer element 710. As can be seen in FIG. 23, the applicator 790 is slightly wider than the heat transfer element 710. Further, the applicator 790 is preferably one eighth of an inch (0.0125") thick, as illustrated in FIG. 22B, which figure is a side plan view of the applicator 790. The applicator 790 includes a plurality of protuberances 792 shaped and dimensioned to leave gaps 794 between the applicator 790 and the heat transfer element 710. The size of these gaps 794 determines the thickness of the layer of HTC applied using the applicator. Thus, a thicker layer of HTC is applied to the curved mounting surfaces 714 of the heat transfer element 710 than to the channel 716. This is preferred so that when the heat transfer element is secured to the tracer and the pipe there will be a thicker layer of HTC (preferably one eighth of an inch as noted above) between the heat transfer element 790 and the pipe, and a thinner layer of HTC (preferably five one hundredths of an inch as noted above) between the heat transfer element 710 and the tracer. Applicator 790 further includes a tail 798 configured to apply HTC solely to the channel 716.

Figure 24A:
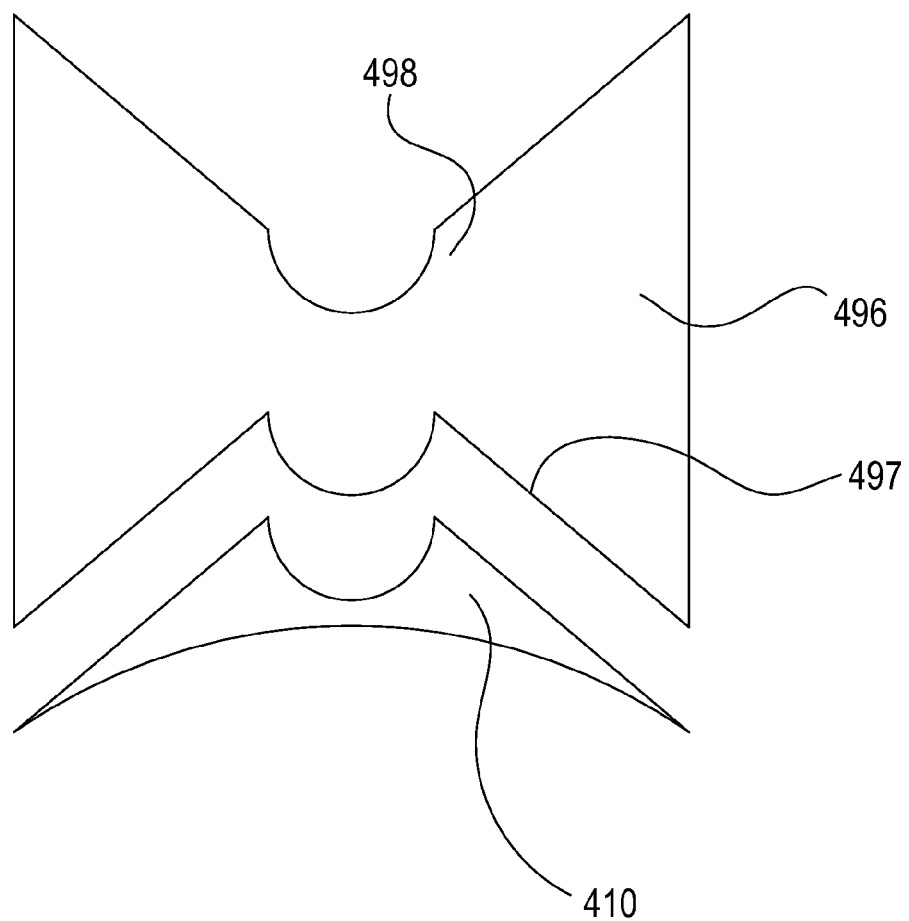
FIGS. 24A-B illustrate an applicator configured for use with the heat transfer element of FIG. 18.
Figure 24B:
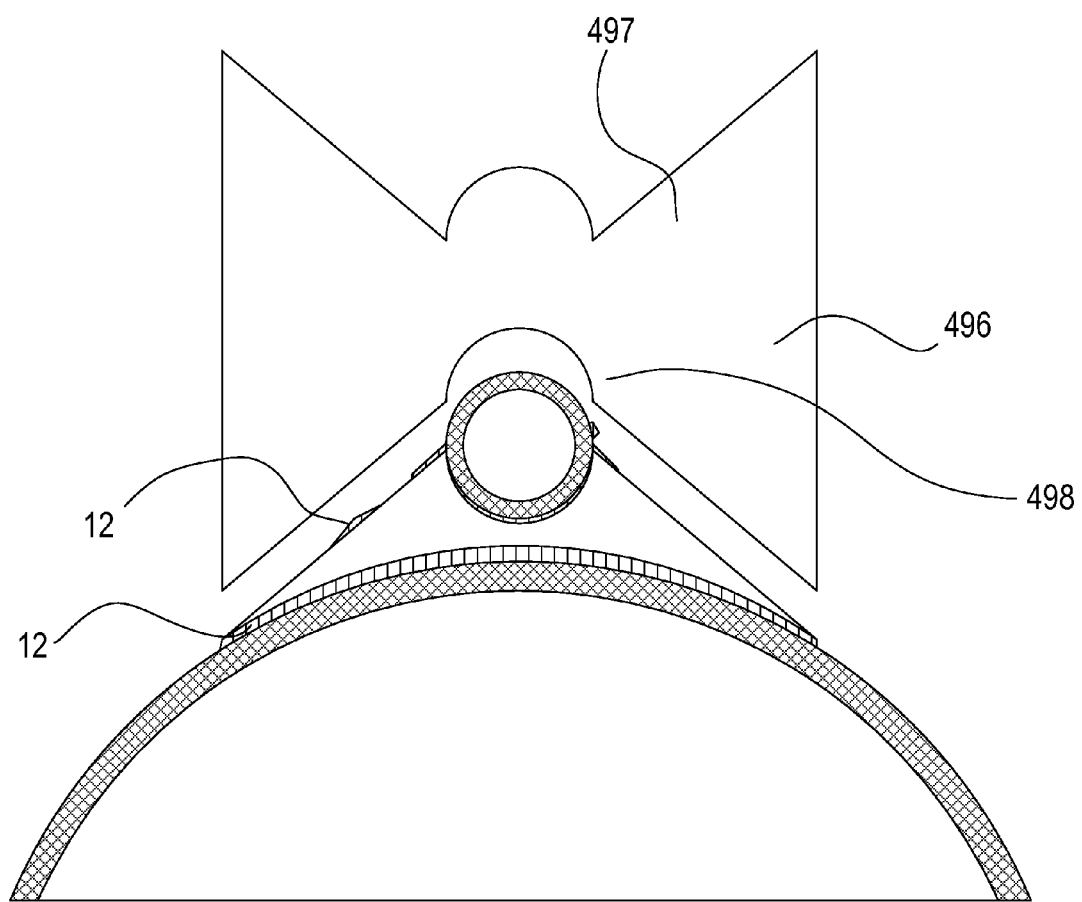

In at least some implementations, an applicator is configured to reclaim HTC from a pipe and/or tracer as well. FIG. 24A illustrates the head 496 of such an applicator configured for use with heat transfer element 410. The head 496 includes a loading side 497 and a reclaiming side 498. FIG. 24A illustrates how the loading side 497 can be used to apply HTC to heat transfer element 410, and FIG. 24B illustrates how the reclaiming side can be used to reclaim excess HTC 12 after installation of heat transfer element 410. Although not illustrated, the applicator preferably includes a handle.

After HTC is applied and the heat transfer element is secured to the pipe together with the tracer, heavy duty bands or buckles are used to strap the heat transfer element (and tracer) in place. Preferably, stainless steel bands or buckles are used every four feet, however, it will be appreciated that an alternative setup may be utilized.

Notably, heat transfer elements which retain the tracer between themselves and the pipe have the desirable property of shielding the tracer from force applied by any strap or buckle, likely obviating the risk of compromising the integrity of the tracer.

After the heat transfer elements have been strapped on, final hook-up connections are made. Preferably, one loop is utilized per elbow and tee. Further, it is preferable that no jumpers are used for reducers.

Manufacturing

As noted hereinabove, a heat transfer element is preferably extruded, but alternatively may be cast. Straight heat transfer elements are preferably manufactured by making a die and extruding the shape in mass production. Preferably, ten to twenty foot lengths are thus obtained, although in an implementation these lengths are nine feet six inches (9'6") long. These lengths can be further cut as desired (such as, in a preferred implementation, to a max length of nine feet six inches, which it is believed may be advantageous for transportation via, for example, shipping).

Elbow heat transfer elements (and reducer heat transfer elements and flange heaters) are preferably specially made for each size pipe elbow. Each heat transfer element is preferably extruded and then bent, but, alternatively, may be cast.

Use with Electric Tracers

Although described hereinabove largely in the context of tube tracers having fluid flowing therethrough, a heat transfer element could equally be utilized with an electric tracer. It will be appreciated that it is common to run current through an electrical wire adjacent a pipe to create energy, thereby heating the pipe and any product flowing therethrough.

Figure 25A:
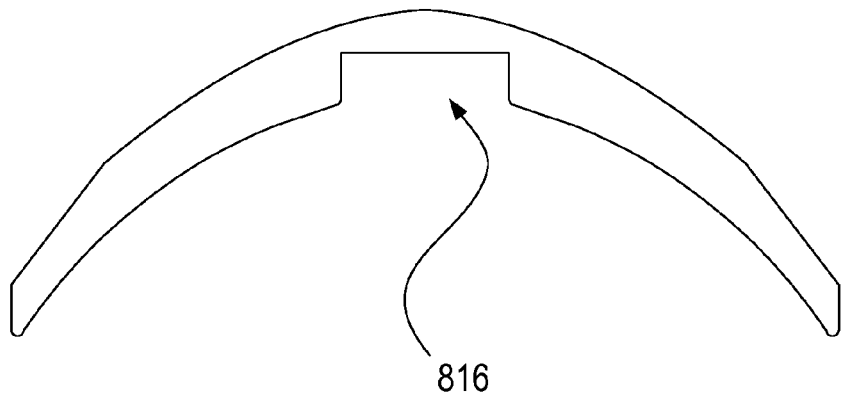
FIGS. 25A-C are cross-sectional views of heat transfer elements having a channel configured to receive an electrical tracer therein.

FIG. 25A is a cross-sectional view of a heat transfer element 810 having a channel 816 configured to receive an electrical tracer therein. It will be appreciated that heat transfer elements having other cross-sectional shapes could be utilized with an electrical tracer as well.

Figure 25B:
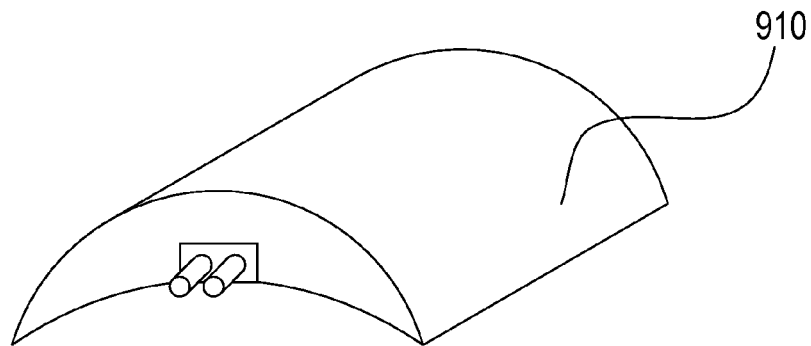
Figure 25C:
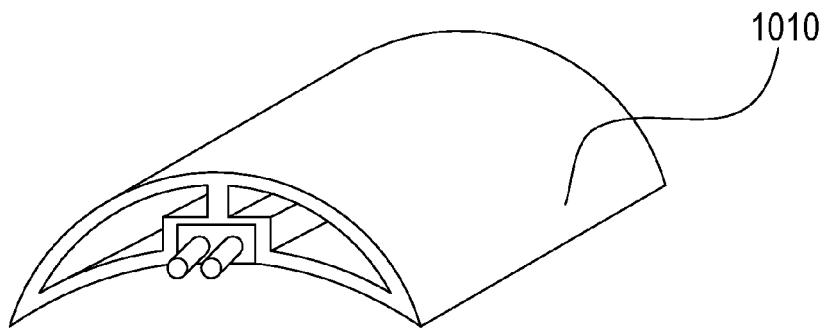
Figure 26:
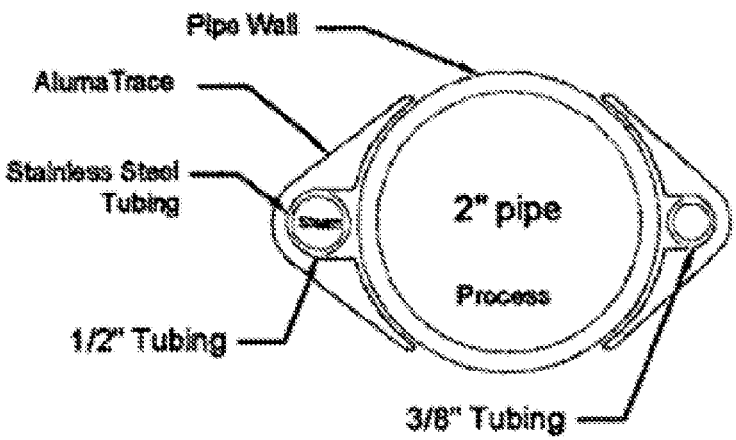
FIGS. 26-33 illustrate heat transfer elements configured to receive different size tracers utilized together with the same pipe.
Figure 27:
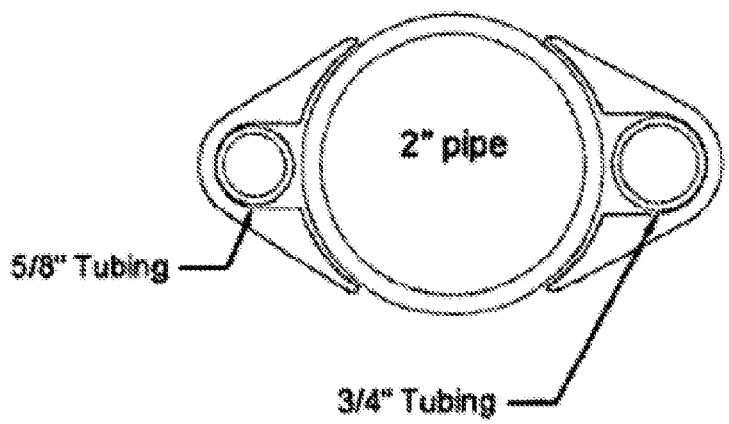
Figure 28:
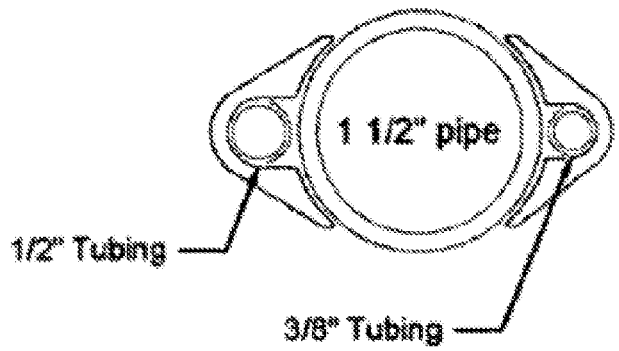
Figure 29:
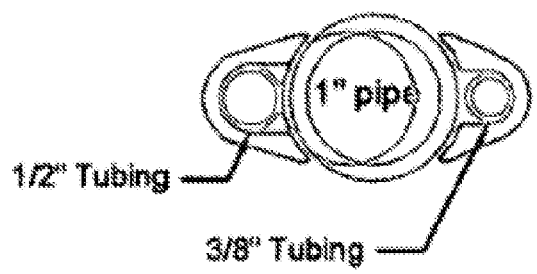
Figure 30:
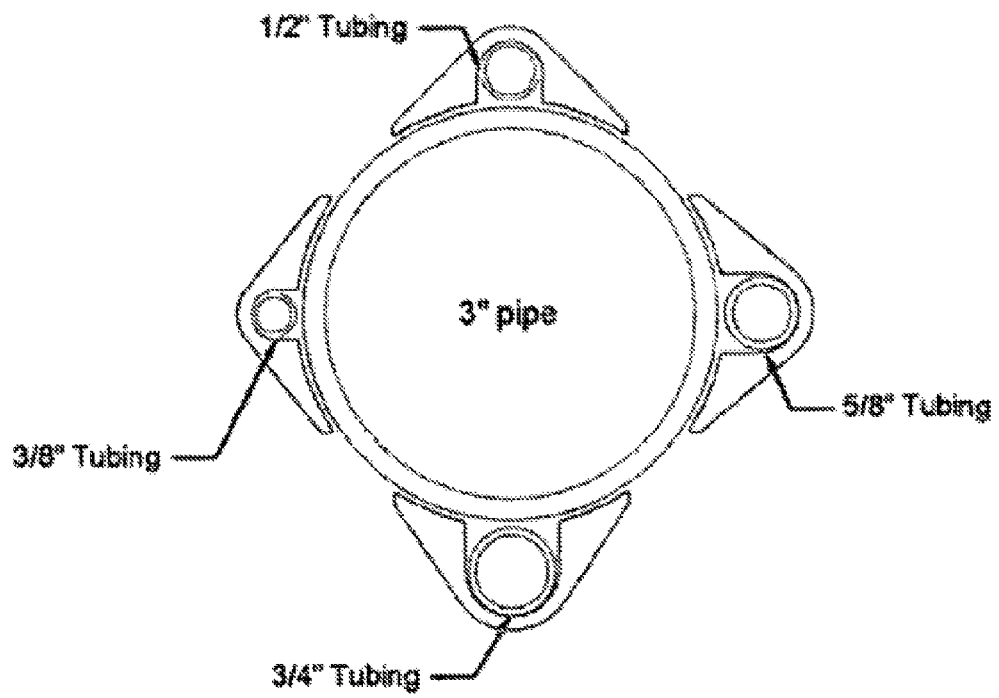
Figure 31:
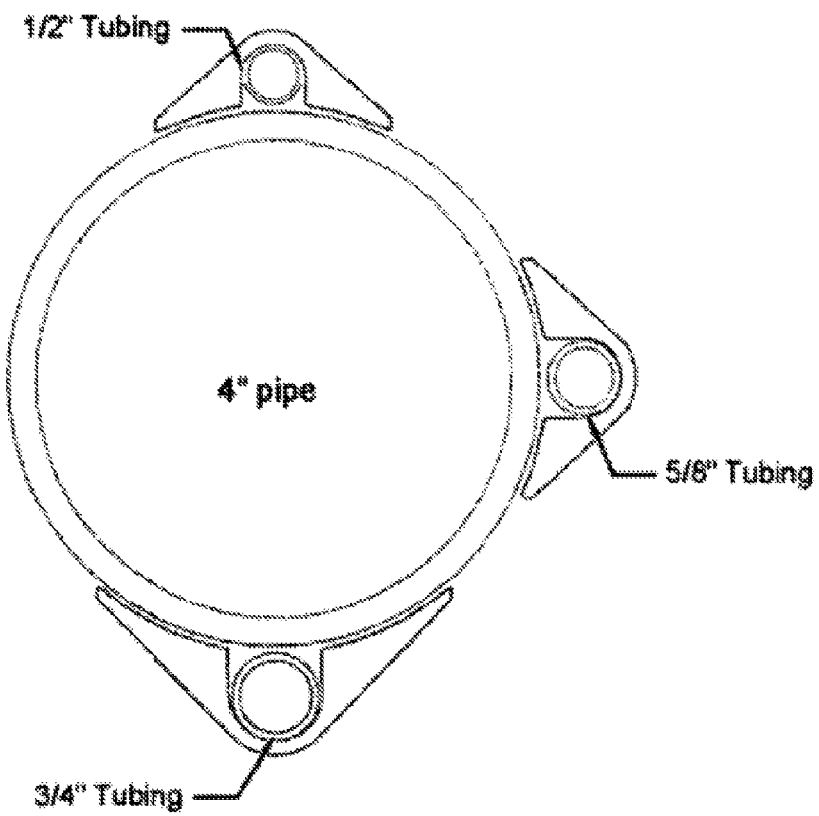
Figure 32:
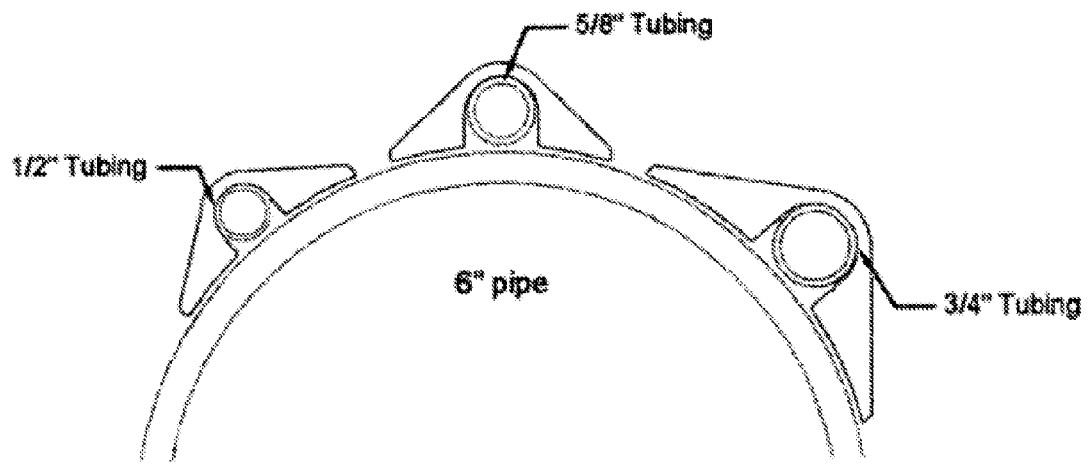
Figure 33:
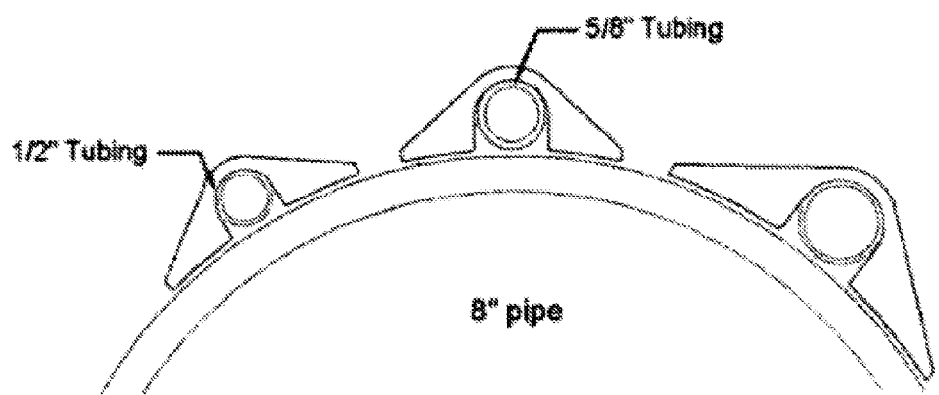

FIGS. 25B and 25C illustrate heat transfer elements 910 and 1010 together with exemplary electrical tracers. Each exemplary tracer is illustrated as including ends of wires protruding therefrom, for ease of understanding. It will be appreciated that the exemplary illustrated tracers are exactly that, exemplary, and that any type or form of electrical tracer may be utilized in combination with an appropriately configured heat transfer element.

Use for Cooling

Similarly, although described herein in the context of tracers utilized for heating, a heat transfer element could equally be utilized in a cooling application, such as, for example, with a tracer having cold water or a fluid coolant could flow therethrough for maintaining an adjacent pipe at or below a certain temperature.

Anodized Heat Transfer Elements

In a preferred embodiment, a heat transfer element is anodized.

CONCLUSION

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A heat transfer element comprising:
    (a) an inner surface running a length of the heat transfer element, the inner surface comprising
        (i) first and second curved mounting surfaces configured to mate with an outer surface of a pipe for attachment thereto,
        (ii) first and second parallel channel walls each extending from an interior portion of a respective one of the first and second curved mounting surfaces,
        (iii) a curved channel ceiling having an elliptical cross-sectional shape extending between the first and second parallel channel walls, the channel ceiling having a curvature configured to correspond to a curvature of an outer surface of tracer tubing, and
        (iv) a lengthwise opening defined between the two curved mounting surfaces, the lengthwise opening being an opening of an interior lengthwise channel defined by the first and second parallel channel walls and the curved channel ceiling, the interior lengthwise channel being sized and dimensioned to receive tracer tubing therein; and
    (b) an outer surface running the length of the heat transfer element which does not provide access to the interior lengthwise channel;
    (c) wherein the heat transfer element is configured for attachment to a pipe, utilizing heat transfer cement, with tracer tubing received within the interior lengthwise channel such that
        (i) the heat transfer element effects conductive heat transfer between the tracer tubing received within the channel and the pipe the heat transfer element is attached to, including conductive heat transfer through the curved mounting surfaces of the heat transfer element,
        (ii) the outer surface of the heat transfer element is located in covering relation to the interior lengthwise channel and the tracer tubing received therein, and serves to physically protect the tracer tubing received therein, and
    (d) wherein the heat transfer element is configured to allow for installation over installed tracer tubing by translating the heat transfer element down over installed tracer tubing secured to a traced pipe; and
    (e) wherein the heat transfer element comprises metal.

2. The heat transfer element of claim 1, wherein the heat transfer element comprises aluminum.

3. The heat transfer element of claim 1, wherein the heat transfer element comprises extruded metal.

4. The heat transfer element of claim 1, wherein the heat transfer element comprises an aluminum alloy.

5. The heat transfer element of claim 1, wherein the heat transfer element further includes one or more cavities defined therein.

6. The heat transfer element of claim 5, wherein at least one of the one or more cavities has a triangular cross-sectional shape.

7. The heat transfer element of claim 1, wherein the heat transfer element is anodized.

8. The heat transfer element of claim 1, wherein the heat transfer element comprises stainless steel.

9. The heat transfer element of claim 1, wherein the heat transfer element comprises carbon steel.

10. The heat transfer element of claim 1, wherein the heat transfer element comprises copper.

11. The heat transfer element of claim 1, wherein the heat transfer element comprises an aluminum alloy.

12. The heat transfer element of claim 1, wherein the heat transfer element comprises cast metal.

13. The heat transfer element of claim 1, wherein the parallel channel walls are half an inch apart, thereby defining a channel having a width "A" of half an inch.

14. The heat transfer element of claim 1, wherein the heat transfer element has a width "w" of 2 inches.

15. The heat transfer element of claim 1, wherein the ratio of a width "w" of the heat transfer element to a width "A" of the channel of the heat transfer element is around four.

16. A method for facilitating heat transfer, comprising the steps of:
    (a) applying heat transfer cement to at least one of
        (i) a process pipe having a tracer running therealong, and
        (ii) a metal heat transfer element comprising
            (A) an inner surface running a length of the heat transfer element, the inner surface comprising
                (1) first and second curved mounting surfaces configured to mate with an outer surface of a pipe for attachment thereto,
                (2) first and second parallel channel walls each extending from an interior portion of a respective one of the first and second curved mounting surfaces,
                (3) a curved channel ceiling having an elliptical cross-sectional shape extending between the first and second generally parallel channel walls, the channel ceiling having a curvature configured to generally correspond to a curvature of an outer surface of tracer tubing, and
                (4) a lengthwise opening defined between the two curved mounting surfaces, the lengthwise opening being an opening of an interior lengthwise channel defined by the first and second parallel channel walls and the curved channel ceiling, the interior lengthwise channel being sized and dimensioned to receive tracer tubing therein, and (B) an outer surface running the length of the heat transfer element which does not provide access to the interior lengthwise channel; and (b) installing the heat transfer element on the process pipe, said installing including,
  (i) positioning the heat transfer element over top of the process pipe and the tracer,
  (ii) translating the heat transfer element down over the tracer so as to
    (A) cause the tracer to be received within the interior lengthwise channel of the heat transfer element, the channel including heat transfer cement therein, and
    (B) cause the curved mounting surfaces of the heat transfer element to abut an outer surface of the process pipe, heat transfer cement being disposed on the mounting surfaces of the heat transfer element;

(c) wherein the heat transfer element is installed such that,
  (i) the first and second curved mounting surfaces of the heat transfer element are secured to an outer surface of the process pipe,
  (ii) a length of the tracer is received within the interior lengthwise channel of the heat transfer element,
  (iii) the heat transfer element is positioned to effect conductive heat transfer between the tracer received within the channel and the process pipe the heat transfer element is attached to, including conductive heat transfer through the curved mounting surfaces of the heat transfer element,
  (iv) the top surface of the heat transfer element is located in covering relation to the interior lengthwise channel and the tracer received therein, and serves to physically protect the tracer received therein, and
  (v) a continuous heat transfer cement fill layer is disposed between the tracer received within the interior lengthwise channel of the heat transfer element and the process pipe the heat transfer element is attached to, the heat transfer cement fill layer comprising
    (A) first and second opposed generally concave surfaces,
    (B) wherein the first generally concave surface is in abutment with a first portion of the tracer tubing received within the interior lengthwise channel, the first portion being disposed proximate a second portion of the pipe the heat transfer element is attached to, and
    (C) wherein the second generally concave surface is in abutment with the second portion.

17. The method of claim 13, wherein the tracer comprises a fluid tracer.

18. The method of claim 13, wherein the tracer comprises an electrical tracer.

19. A heat transfer system, comprising:
(a) a pipe having a fluid flowing therethrough;
(b) a heat transfer element secured to the pipe, the heat transfer element comprising
  (i) an inner surface running a length of the heat transfer element, the inner surface comprising,
    (A) first and second curved mounting surfaces configured to mate with an outer surface of the pipe for attachment thereto,
    (B) first and second parallel channel walls each extending from an interior portion of a respective one of the first and second curved mounting surfaces,
    (C) a curved channel ceiling having an elliptical cross-sectional shape extending between the first and second parallel channel walls, the channel ceiling having a curvature configured to correspond to a curvature of an outer surface of tracer tubing, and
    (D) a lengthwise opening defined between the two curved mounting surfaces, the lengthwise opening being an opening of an interior lengthwise channel defined by the first and second parallel channel walls and the curved channel ceiling, the interior lengthwise channel being sized and dimensioned to receive tracer tubing therein, and
  (ii) an outer surface running the length of the heat transfer element which does not provide access to the interior lengthwise channel;
(c) a tracer received within the interior lengthwise channel of the heat transfer element, the tracer being configured to heat fluid flowing through the pipe;
(d) wherein the heat transfer element is attached to the pipe with the tracer received within the channel such that
  (A) the heat transfer element effects conductive heat transfer between the tracer received within the interior lengthwise channel and the pipe the heat transfer element is attached to, including conductive heat transfer through the curved mounting surfaces of the heat transfer element, and
  (B) the outer surface of the heat transfer element is located in covering relation to the interior lengthwise channel and the tracer received therein, and serves to physically protect the tracer received therein; and
(e) wherein the heat transfer element comprises metal.

20. The system of claim 19, wherein the heat transfer element comprises aluminum.

* * * * *